(12) United States Patent
Horii et al.

(10) Patent No.: US 7,860,627 B2
(45) Date of Patent: Dec. 28, 2010

(54) AUTOMATIC OPTICAL AXIS DIRECTION ADJUSTING APPARATUS FOR VEHICLES

(75) Inventors: Yasutoshi Horii, Nagoya (JP); Junichi Hasegawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/314,359

(22) Filed: Dec. 9, 2008

(65) Prior Publication Data

US 2009/0105912 A1 Apr. 23, 2009

Related U.S. Application Data

(62) Division of application No. 10/861,567, filed on Jun. 7, 2004, now Pat. No. 7,477,976.

(30) Foreign Application Priority Data

| Jul. 28, 2003 | (JP) | ............................. 2003-281204 |
| Dec. 12, 2003 | (JP) | ............................. 2003-415360 |
| Mar. 23, 2004 | (JP) | ............................. 2004-084009 |

(51) Int. Cl.
  B60Q 1/06 (2006.01)
  B60Q 1/24 (2006.01)
  B60Q 1/00 (2006.01)
  G06F 7/00 (2006.01)
(52) U.S. Cl. ............................. 701/49; 362/36; 362/37; 362/464; 362/465
(58) Field of Classification Search ............... 701/36, 701/49; 362/466, 465, 37, 41, 464, 36, 460; 307/10.8; 359/520, 522, 533; 340/468
See application file for complete search history.

(56) References Cited

U.S. PATENT DOCUMENTS 5,562,336 A  10/1996  Gotou

| 5,588,733 A | | 12/1996 | Gotou | |
| 6,049,749 A | * | 4/2000 | Kobayashi | ................... 701/49 |
| 6,309,094 B1 | * | 10/2001 | Woerner | .................... 362/539 |

(Continued)

FOREIGN PATENT DOCUMENTS

JP  61-211146  9/1986

(Continued)

OTHER PUBLICATIONS

Office Action issued Jun. 8, 2009 in corresponding Japanese Application No. 2004-084009 with an at least partial English language translation thereof.

(Continued)

*Primary Examiner*—Thomas G Black
*Assistant Examiner*—Christine Behncke
(74) *Attorney, Agent, or Firm*—Nixon & Vanderhye P.C.

(57) ABSTRACT

A vehicle headlight apparatus receives road data from a navigation system. The apparatus has a first and a second swivel devices for adjusting an optical axis directions of a main light and a sub-light corresponding to one and the other headlights of a right and a left headlights, respectively. The apparatus also has a control unit, which separately controls the first and the second swivel devices, so that a one-eye navigation-co-operated control operation can be carried out which adjusts only the optical axis direction of the main light to be coincident with a road direction calculated based upon the road data.

15 Claims, 27 Drawing Sheets

U.S. PATENT DOCUMENTS

| | | |
|---|---|---|
| 6,609,817 B2 * | 8/2003 | Niwa et al. .................. 362/466 |
| 6,755,560 B2 | 6/2004 | Horii |
| 6,805,472 B2 | 10/2004 | Fukawa |
| 2002/0001195 A1 * | 1/2002 | Iwamoto et al. ............. 362/466 |
| 2002/0036901 A1 * | 3/2002 | Horii et al. .................... 362/37 |
| 2002/0039296 A1 | 4/2002 | Nishimura et al. |
| 2003/0067763 A1 * | 4/2003 | Fukawa ....................... 362/40 |
| 2003/0067780 A1 | 4/2003 | Fukawa |
| 2004/0032743 A1 * | 2/2004 | Dari et al. ................... 362/466 |
| 2004/0114379 A1 * | 6/2004 | Miller et al. ................ 362/464 |

FOREIGN PATENT DOCUMENTS

| | | |
|---|---|---|
| JP | 2002-225617 | 8/2002 |
| JP | 2003-182449 | 7/2003 |

OTHER PUBLICATIONS

Office Action issued on Apr. 22, 2008 in corresponding JP Application No. 2003-415360 (and at least partial English version thereof).

* cited by examiner

SUB-LIGHT AXIS DIRECTION

MAIN LIGHT AXIS DIRECTION

SUB-LIGHT AXIS DIRECTION

MAIN LIGHT AXIS DIRECTION

SUB-LIGHT AXIS DIRECTION

STEERED ANGLE α

θnav

AUTOMATIC OPTICAL AXIS DIRECTION ADJUSTING APPARATUS FOR VEHICLES

This is a divisional application of U.S. application Ser. No. 10/861,567 (Now U.S. Pat. No. 7,477,976), filed Jun. 7, 2004, which in turn is based on and incorporates Japanese Patent Application Nos. 2003-281204 filed on Jul. 28, 2003, No. 2003-415360 filed on Dec. 12, 2003 and No. 2004-84009 filed on Mar. 23, 2004. The contents of all of the above-listed applications are incorporated herein by reference in their entirety.

FIELD OF THE INVENTION

The present invention relates to a vehicle headlight apparatus capable of adjusting optical axes with respect to headlights installed at front planes of a vehicle. The present invention also relates to an automatic optical axis direction adjusting apparatus for vehicle headlights, which automatically adjusts optical axis directions of left/right forward light irradiation, and also automatically adjusts irradiation ranges by headlights installed in a vehicle in response to steering angles of a steering wheel.

BACKGROUND OF THE INVENTION

Conventionally, a vehicle headlight apparatus is arranged so that the optical axis directions of headlights provided on a front plane of a vehicle can be changed within a plane which is located substantially parallel to a plane of a road in response to a steering angle of a steering wheel (JP61-211146A).

A driver of a vehicle generally performs a driving operation while observing a road extending in a forward direction. In a case that there is a curvature change in a forward road shape, there are some possibilities that a traveling direction of the vehicle when the above steering angle is kept constant is not always made coincident with the actual road direction. As a result, in the above vehicle headlight apparatus, it is practically difficult that the optical axes of the headlights are directed to a road succeeding to a curved road which the vehicle driver wants to see under such a condition that the curvature of a road is rapidly varying, for instance, a road changing from straight to curved.

Under such a circumstance, a navigation-cooperated control type vehicle headlight apparatus is proposed (for instance, U.S. Pat. No. 5,588,733 (JP 3111153)). This navigation-cooperated control type vehicle headlight apparatus is arranged by combining with a navigation system in order to accept a curvature change in shapes of forward roads. In this navigation system, positional information detected by such a position sensing device as GPS (Global Positioning System) is related to map information. This vehicle headlight apparatus controls optical axis directions of the headlights in cooperation with the navigation system.

Since such a navigation-cooperated control type vehicle headlight apparatus may acquire the information related to structures of the forward roads in advance, even under such a travel condition that the road curvatures are varied, the optical axes of the headlights can be directed in the proper manner.

However, the conventional navigation-cooperated control type vehicle headlight apparatus is not satisfactory. Specifically, if the precision of the electronic map information provided by the navigation system is not sufficiently high, then this vehicle headlight apparatus can hardly control the optical axes of the headlights in the proper manner.

For instance, there remains an error in a position of an inflection point which can be recognized by the vehicle headlight apparatus, and there is a deviation between this recognized inflection point and the inflection point (i.e., junction point between straight road and corner road) of an actual road. Therefore, when a vehicle enters from a straight road into a curved road, there are such possibilities that timing for adjusting the optical axes of the headlights is excessively delayed, or excessively led.

Furthermore, in some cases branch roads are contained in the structure of a forward road for the vehicle. If intention of the vehicle driver cannot be grasped who determines whether this vehicle enters any one of these branch directions, the optical axes directions of the headlights cannot be properly adjusted.

Also, JP2002-225617A discloses an automatic optical axis direction adjusting apparatus for a vehicle headlight. This conventional automatic optical axis direction adjusting apparatus can properly irradiate light beams to the forward road plane of the vehicle irrespective of whether the travel destination has been inputted/set by utilizing the route guidance function in the navigation system (navigation apparatus) mounted on the vehicle.

In this conventional automatic optical axis direction adjusting apparatus for the vehicle headlight, both the optical axis directions of the right/left forward light irradiation and the irradiation ranges by the headlights can be adjusted in advance based upon the forward road information supplied from the navigation system before the steering angle of the steering wheel made by the vehicle driver is detected. Specifically, with respect to the control amounts of the headlight which are calculated based upon the forward road information supplied from the navigation system, the execution of the calculation of the control amounts of the headlights based upon the steering angle of the steering wheel by the vehicle driver is delayed. Also, since the forward road information supplied from the navigation system is not always correct, there remain some possibilities that the control amounts of the headlights are calculated based upon the incorrect forward road information in an improper manner.

As a consequence, when a swivel control operation by the steering operation of the vehicle driver is switched from the advance swivel control operation of the headlights by the navigation system, the optical axis directions of the headlights are moved. As a result, the visually recognizable characteristic of the vehicle driver for the forward road is changed, and/or the vehicle driver will have a sense of incongruity.

SUMMARY OF THE INVENTION

The present invention has been made to solve the conventional problems, and therefore, has a first object to provide a vehicle headlight apparatus capable of securing a forward visual field of a vehicle under better condition irrespective of precision of electronic map information and also irrespective of a structure of a road.

A vehicle headlight apparatus of the present invention is arranged to carry out a first swivel control operation based upon road data, and carries out a one-eye navigation-cooperated control operation by which only the optical axis direction of a main light is adjusted based upon road data.

As a result, the forward road direction, namely a road direction corresponding to the visual line direction of the vehicle driver can be properly illuminated by the main light. Then, in accordance with the one-eye navigation-cooperated control operation, even in a case that the optical axis of the main light is adjusted to an improper optical axis direction based upon the road data, a constant illumination condition can be secured in the forward direction of the vehicle by controlling a sub-light independent from the road data.

In this connection, as a second swivel control method under execution of the one-eye navigation-cooperated control operation, the optical axis of the sub-light may be controlled in such a manner that this optical axis is made substantially coincident with the axis of the vehicle. Also, the optical axis of the sub-light may be controlled based upon the steering angle of a steering wheel, while this steering angle has a high correlative degree with respect to the steering angle of the steering wheel of the vehicle.

A second object of the present invention is to provide an automatic optical axis direction adjusting apparatus for a vehicle headlight without worsening a forward visual recognizable characteristic of a vehicle driver and without causing a sense of incongruity to the vehicle driver due to movement of the optical axis direction of the headlight, which occurs when swivel control operation by a steering operation by the vehicle driver is switched from the advance swivel control operation of the headlight by the navigation system.

In an automatic optical axis direction adjusting apparatus for a vehicle for attaining the second object, in a transition stage while an advance control amount used to adjust an optical axis direction of a headlight of a vehicle reaches a control amount used to adjust an optical axis direction of the headlight, a transitional control amount used to adjust the optical axis direction is variably calculated in response to a time elapse from a detection of a steering angle change until the advance control amount reaches the control amount.

The optical axis direction of the headlight is swiveled so as to adjust the optical axis direction along right and left directions parallel to a horizontal direction based upon the advance control amount before the steering angle change is detected. The optical axis direction of the headlight is swiveled so as to adjust the optical axis direction along the right and left directions parallel to the horizontal direction based upon the transitional control amount until the transitional control amount reaches the control amount after the steering angle change is detected, and also based upon the control amount after the transitional control amount reaches the control amount.

As a consequence, movement in the optical axis direction of the headlight when the advance swivel control operation executed based upon the forward road information supplied from the navigation system is switched to the swivel control operation executed based upon the steering wheel steered by the vehicle driver can be made smooth. Thus, it is possible to avoid that a sense of incongruity is caused to the vehicle driver, without worsening the forward visual recognizable characteristic of the driver.

It should be understood that the advance control amount used to adjust the optical axis direction of the headlight is fixed to the advance control amount in a transition stage defined until it reaches the advance control amount for adjusting the optical axis direction of the headlight. Then, after the steering angle change is detected, the optical axis direction of the headlight may be alternatively swiveled so as to be adjusted based upon the advance control amount which is fixed until the control amount reaches the advance control amount.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENT

First Embodiment

Figure 1:
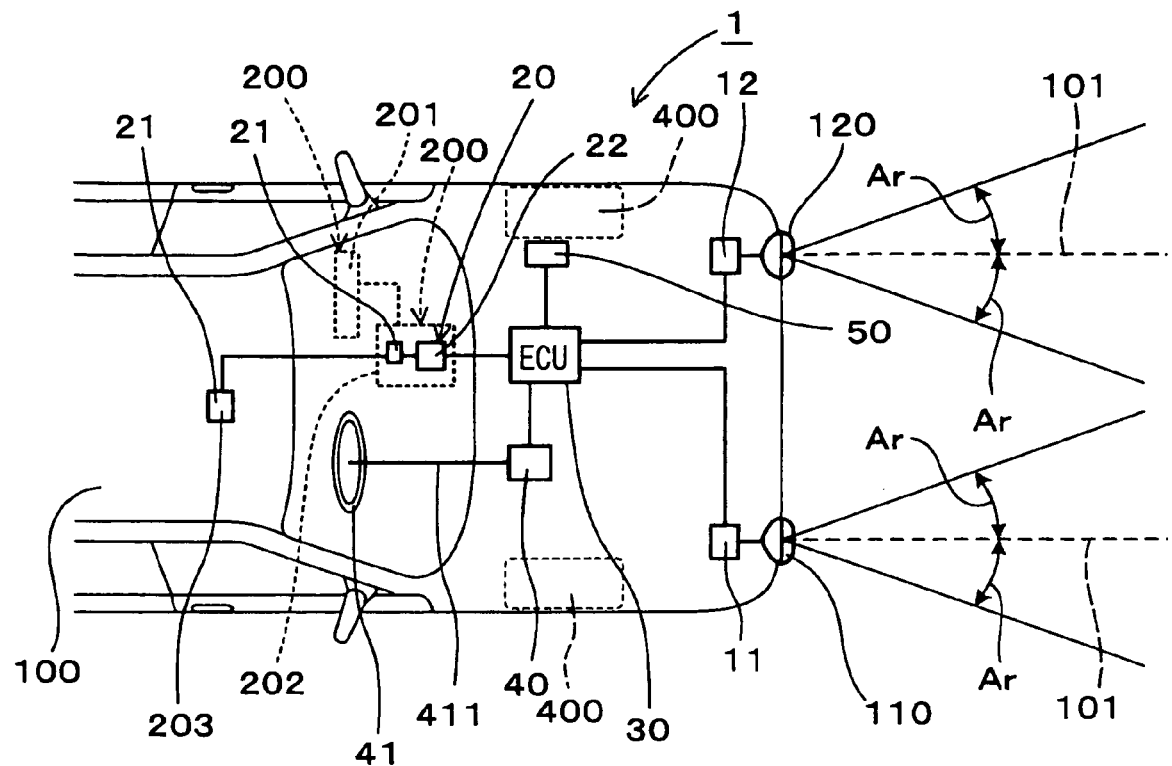
FIG. 1 is a block diagram schematically showing a system arrangement of a vehicle headlight apparatus according to a first embodiment of the present invention.

Referring first to FIG. 1, a vehicle headlight apparatus 1 is arranged in such a manner that optical axes of one set (namely, right and left sides) of headlights 110 and 120 can be adjusted along a horizontal direction. The right-sided and left-sided headlights 110 and 120 are arranged at a front surface of a vehicle 100.

The vehicle headlight apparatus 1 is arranged by employing a road data output device 20 containing a position sensor 21 and a map database 22; a first swivel device 11; a second swivel device 12; and a light distribution control ECU 30. The position sensor 21 senses a position of the vehicle 100. The map database 22 stores therein electronic map information. The road data output device 20 refers to the map database 22 based upon the vehicle position, and outputs road data indicative of a structure of a road which forms a travel course of the vehicle 100. The first swivel device 11 adjusts an optical axis direction of a main light (headlight 110) corresponding to one headlight ahead of a driver's seat on the right side of the vehicle 100 between the headlights 110 and 120. The second swivel device 12 adjusts an optical axis direction of a sub-light (headlight 120) corresponding to the other headlight between the headlights 110 and 120. The control ECU 30 is arranged in such a manner that the first and second swivel devices 11 and 12 are independently controlled.

This light distribution control ECU 30 is arranged in such a manner that since the light distribution control ECU 30 controls the first swivel device 11 independently from the second swivel device 12, a one-eye navigation-cooperated control operation is carried out so as to adjust only the optical axis direction of the headlight 110 in such a way that this optical axis direction is made coincident with a road direction which has been calculated based upon road data.

In addition, the vehicle headlight apparatus 1 employs a vehicle speed sensor 50 for sensing a travel speed of the vehicle 100, and a steering angle sensor 40 for sensing a steering angle of a steering wheel 41. Also, the vehicle headlight apparatus 1 is so arranged that output signals of these sensors 40 and 50 are applied into the light distribution control ECU 30.

Also, in the vehicle headlight apparatus 1, the road data output device 20 is arranged in such a manner that a portion of functions of a navigation system 200 is utilized. This navigation system 200 is arranged by employing a GPS antenna 203 for receiving GPS electromagnetic waves transmitted from GPS satellites, a navigation ECU 202 for performing a route guide and the like, and a display 201 for displaying thereon a map.

In the vehicle headlight apparatus 1, a positioning function of the navigation system 200 is utilized as the position detecting sensor 21. In the navigation system 200, signals derived from the GPS antenna 203, a gyro-sensor 204 (refer to FIG. 2), and the vehicle speed sensor 50 are inputted so as to calculate an absolute position of the vehicle 100. Also, in the vehicle headlight apparatus 1, a hard disk device 206 (FIG. 2) which stores therein the electronic map information in the navigation system 200 is used as the map database 22.

Figure 2:
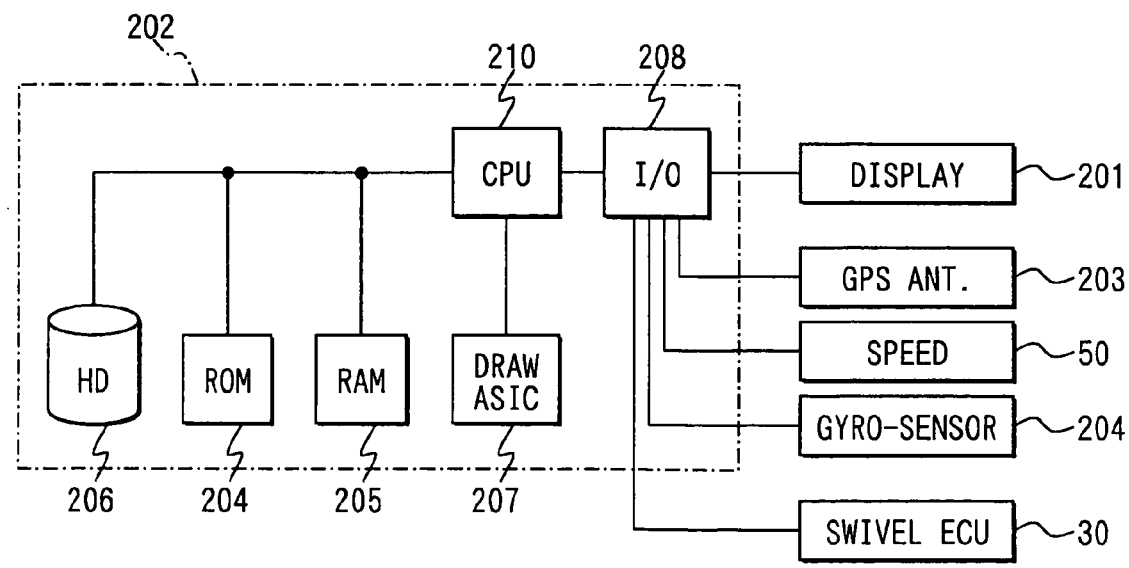
FIG. 2 is a block diagram schematically showing a hardware structure of a navigation ECU employed in the vehicle headlight apparatus of the first embodiment.

The navigation ECU 202 which forms a main portion of this navigation system 200 is constructed by employing, as shown in FIG. 2, a CPU 210, an I/O circuit 208, a ROM 204, a RAM 205, and also, a hard disk device 206 functioning as the map database 22 (FIG. 1).

This navigation ECU 202 is constructed in such a manner that output signals of the GPS antenna 203, the vehicle speed sensor 50, and the gyro-sensor 204 are inputted via the I/O circuit 208, and the navigation ECU 202 outputs control signals with respect to both the display 201 and the light distribution control ECU 30.

In the navigation ECU 202, a position detecting unit (not shown) which forms the position detecting sensor 21 is arranged as follows. That is, the position detecting unit calculates a position of the own vehicle based upon both a vehicle speed sensed by the vehicle speed sensor 50 and an output signal of the gyro-sensor 204, and further can calculate a correct position of the own vehicle by performing a correction operation by the well-known map matching and another correction operation based upon positioning information of a GPS receiver (not shown).

The navigation ECU 202 is arranged in such a manner that this navigation ECU 202 refers to the electronic map information stored in the hard disk device 206 based upon the position of the own vehicle which is detected by the position detecting unit, and expands a map image by employing a drawing ASIC 220 based upon this observed electronic map information.

The display 201 is arranged in such a manner that this display 201 displays thereon the map image which is outputted by the navigation ECU 202.

Figure 3:
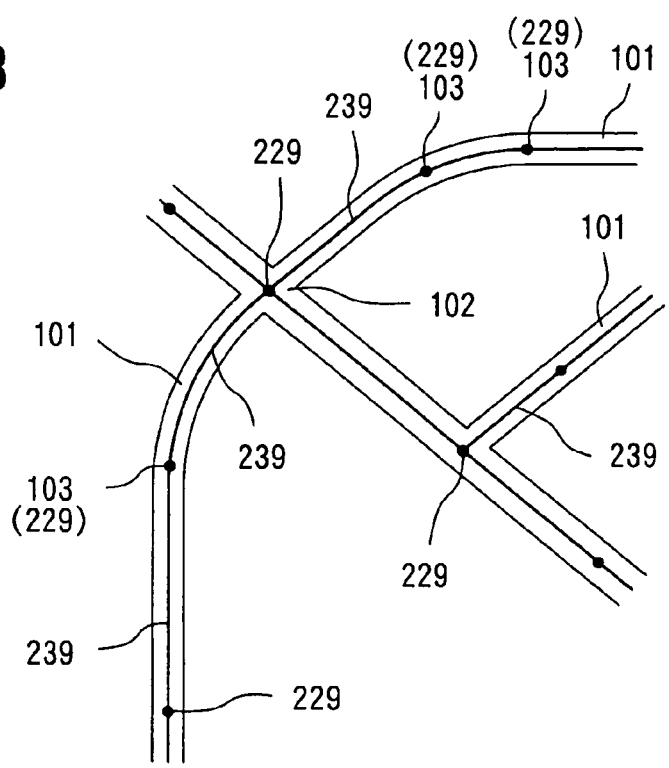
FIG. 3 is an explanatory diagram showing electronic map information based upon a vector method executed in the vehicle headlight apparatus of the first embodiment.

In this case, as shown in FIG. 3, such information related to shapes of roads and road structures such as road attributes (branch roads and straight roads) among the electronic map information which has been previously stored in the hard disk device 206 is expressed by a plurality of nodes 229 functioning as via points of road 101s, and arcs 239 which indicate adjoining relationship among the nodes 229.

The nodes 229 are arranged at least every transition point such as a point of inflection of a road curvature, and an intersection (crossing) 102.

Intervals of arrangement of the nodes 229 are different from each other, depending upon shapes of roads, sorts of roads, and the like. The intervals are set to a coarse interval in a straight road, whereas the intervals of arrangement are set to a fine interval in a curved road. Also, the intervals of arrangement of the nodes 229 are set to a fine interval in a trunk road, a major national road, and the like, as compared with those of a general road.

Figure 4:
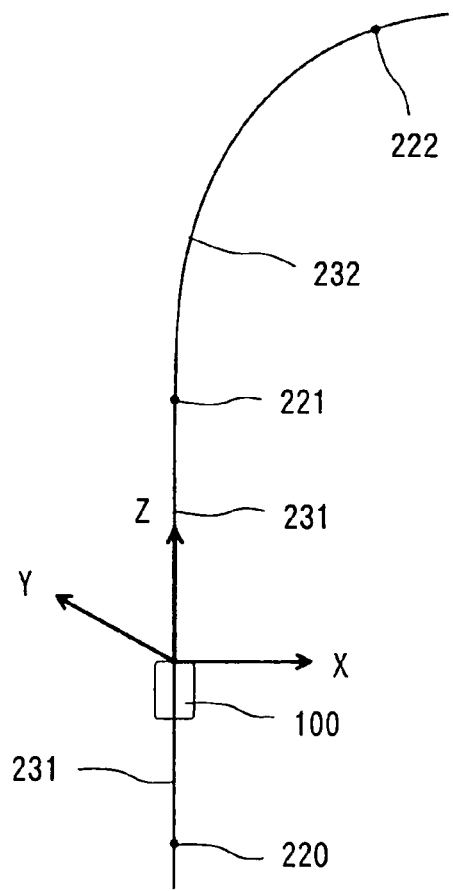
FIG. 4 is an explanatory diagram showing road data outputted in the vehicle headlight apparatus of the first embodiment.

In particular, as shown in FIG. 4, the navigation system 200 is constructed in such a manner that this navigation system 200 may function as the road data output device 20. This road data output device 20 is arranged in order to output both the respective node data and the respective arc data to the light distribution control ECU 30 as the road data. The respective node data are related to a first node 221 which is located immediately close to the vehicle 100 along a forward travel direction, a zero-th node 220 which is located immediately close to the vehicle 100 along a backward travel direction, and a second node 222 which is located to follow the first node 221. The respective arc data are related to a first arc 231 which connects the zero-th node 220 to the first node 221, and a second arc 232 which connects the first node 221 to the second node 222.

In addition, the navigation system 200 is arranged in such a manner that a mode signal is outputted to the light distribution control ECU 30. This mode signal indicates whether the navigation system 200 is operated under route navigation.

Namely, mode signal indicates 1 under route navigation, whereas mode signal indicates 0 under any operation other than route navigation.

It should be noted that the node data outputted from the navigation system 200 correspond to, as indicated in FIG. 4, such combination data made by combining ID data and three-dimensional position data (x, y, z) with attribute data.

The ID data specify the respective nodes 220 to 222. The three-dimensional position data represent three-dimensional relative positions of the respective nodes 220 to 222, while a position of the own vehicle is set to a reference position. The attribute data indicate sorts of roads such as an intersection, a major national road, a trunk road, a vehicle-only road, a branch road, and the like.

Also, the arc data correspond to such combination data made by combining the respective ID data of nodes with curvature data. The nodes of the respective ID data are located at both ends of each of the respective arcs 231 and 232. The curvature data indicate curvatures of the arcs which couple these nodes to each other.

In particular, the vehicle headlight apparatus 1 is constructed in such a manner that this vehicle headlight apparatus 1 is operated under route navigation (namely, mode signal is under state of 1). The navigation system 200 selects a node present on a road to which the vehicle 100 is guided, and outputs the selected node as the second node.

For instance, in a case that a road sort of the first node corresponds to an intersection, the navigation system 200 selects a single second node and a single second arc from a route which is branched from this intersection.

As shown in FIG. 1, under a traffic law which determines a left drive rule (for instance, Japanese traffic law), a headlight which is arranged on the side of an opposite traffic lane is defined as the main light 110, whereas the other headlight is defined as the sub-light 120 while the vehicle 100 is driven.

Further, in this vehicle headlight apparatus 1, it is so arranged that the optical axis of the main light 110 can be adjusted by the first swivel device 11, and the optical axis of the sub-light 120 can be adjusted by the second swivel device 12.

Figure 5:
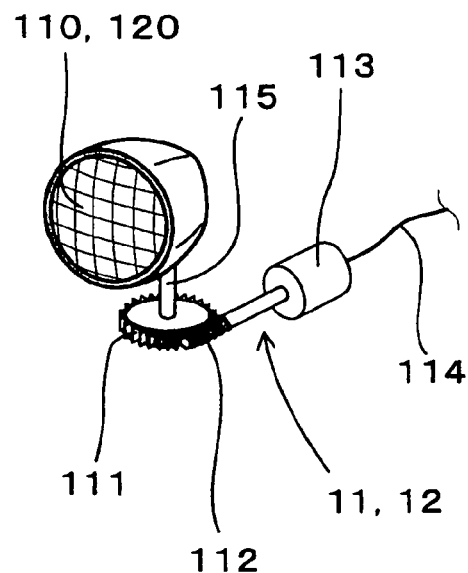
FIG. 5 is a perspective view showing both a headlight and a swivel apparatus provided in the vehicle headlight apparatus of the first embodiment.

As shown in FIG. 5, the swivel devices 11 and 12 are constructed with such a drive mechanism which is made by combining a motor 113, a worm gear 112, and a worm wheel 111. The motor 113 is electrically connected via a control signal line 114 to the light distribution control ECU 30 (FIG. 1). The worm gear 112 is screw-engaged with the worm wheel 111.

As shown in FIG. 5, the worm gear 112 is constructed in such a manner that this worm gear 112 is rotated with the output shaft of the motor 113 in an integral form. Also, the worm wheel 111 is arranged in such a way that this worm wheel 111 is rotated with a rotation shaft 115 in an integral form, and this rotation shaft 115 swings both the optical axes of the headlights 110 and 120 along the horizontal direction in an integral form.

In the swivel devices 11 and 12, since the rotation force of the motor 113 is transferred to the rotation shaft 115, so that the optical axes of the headlights 110 and 120 can be changed along the horizontal direction.

It should also be noted that in the vehicle headlight apparatus 1, both the optical axis of the main light 110 and the optical axis of the sub-light 120 may be adjusted within such a range that each optical axis is swung respectively at an angle of 15 degrees while a vehicle axis 101 is located at a center (namely, angle range indicated by symbol Ar in FIG. 1).

The steering angle sensor 40 is arranged on the side of an outer peripheral portion of a steering shaft 411, and measures a steering angle which is equal to an operation amount inputted into the steering wheel 41, and then outputs the measured steering angle to the light distribution control ECU 30.

The vehicle speed sensor 50 is arranged to sense a rotation of a vehicle left-side wheel, and then outputs a sensed vehicle speed to the light distribution control ECU 30.

Instead of this sensor arrangement, vehicle speed sensors may be alternatively arranged at the vehicle right-side wheel and the left-side wheel in order that rotations of both wheels can be detected. In this alternative case, measuring precision of the vehicle speeds can be furthermore improved.

Figure 6:
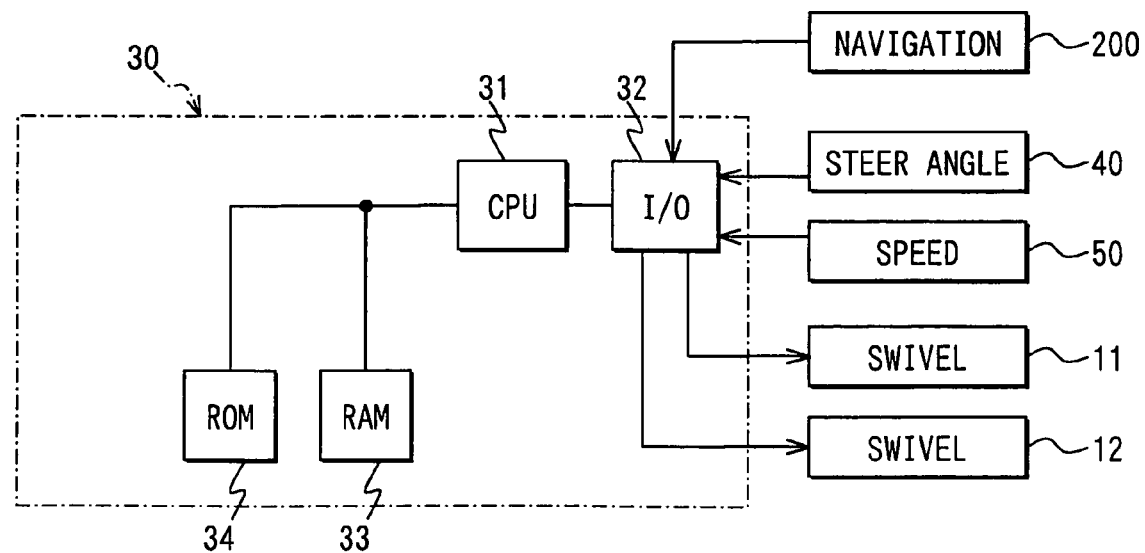
FIG. 6 is a block diagram schematically showing a hardware structure of a light distribution control ECU employed in the vehicle headlight apparatus of the first embodiment.

As indicated in FIG. 6, the light distribution control ECU 30 corresponds to such an apparatus which contains a central processing unit (CPU) 31, a ROM (Read-Only Memory) 34 for storing therein a process program, and the like, a RAM (Random Access Memory) 33 provided as a temporarily storing memory area, and an I/O circuit 32 for inputting/outputting various sorts of signals.

The light distribution control ECU 30 is electrically connected via the I/O circuit 44 to the navigation system 200, the steering angle sensor 40, the vehicle speed sensor 50 and the swivel devices 11 and 12.

In this case, in particular, the light distribution control ECU 30 is constructed in such a manner that both the road data and the mode signal are inputted from the road data output device 20 corresponding to a partial function of the navigation system 200.

Also, a control program for executing a light distribution control of the vehicle headlight apparatus 1 is stored in the ROM 34 of the distribution control ECU 30.

This control program corresponds to such a program which contains a first sub-program, a second sub-program and a third sub-program. The first sub-program is used to calculate a road direction based upon the road data, and the like. The second sub-program is used to calculate a predicted vehicle traveling direction based upon a steering angle, and the like. The third sub-program is used to control the respective swivel devices 11 and 12.

Now, in this embodiment, as the road direction, such a direction is defined along which a predicted vehicle position is expected. This predicted vehicle position may be predicted after a predetermined time elapses based upon both the road data inputted from the road data output device 20, and the vehicle speed inputted from the vehicle speed sensor 50.

Also, as the predicted traveling direction, such a direction is defined along which a predicted vehicle position is expected. This predicted vehicle position may be predicted after a predetermined time elapses based upon both the steering angle inputted into the steering wheel 41, and the vehicle speed inputted from the vehicle speed sensor 50.

Figure 7:
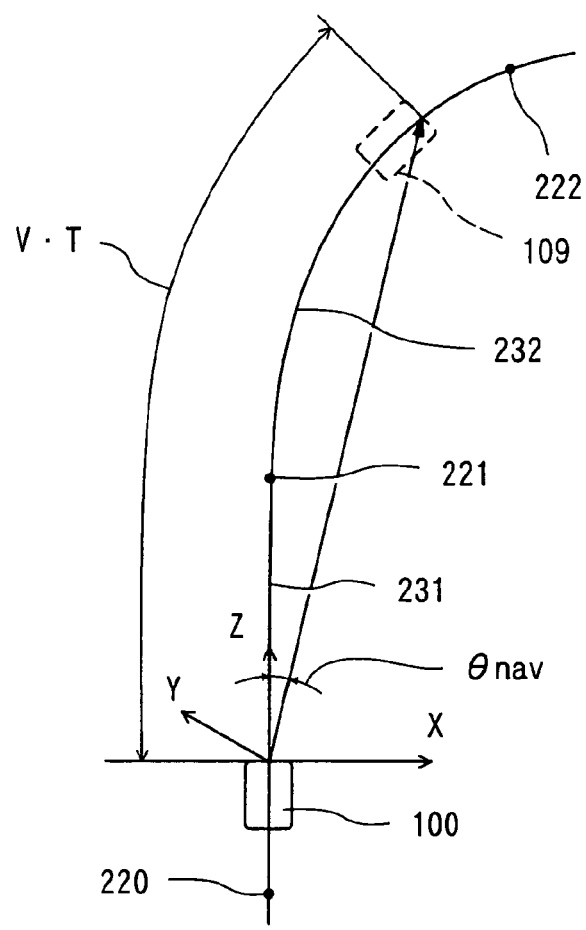
FIG. 7 is an explanatory diagram showing a method of calculating an angle θnav executed in the apparatus of the first embodiment.

The first sub-program corresponds to a calculation routine by which a three-dimensional road shape is reproduced as shown in FIG. 7. In this calculation, the vehicle 100 is set to an origin of a coordinate system based upon the respective data as to the zero-th node 220, the first node 221, the second node 222, the first arc 231, and the second arc 232. Furthermore, when the vehicle 100 travels over a route made of this road shape while maintaining a vehicle speed V m/s, a position of the vehicle 109 which will be attained after a predetermined time T elapses is calculated by this calculation routine.

Then, this first sub-program is arranged in such a way that an angle θnav for expecting a vehicle 109 after T seconds is calculated based upon a positional relationship between the vehicle 100 at the present time instant and the vehicle 109 after T seconds. It should be noted that the predetermined time T is three seconds in this embodiment.

Instead of the structure of the first sub-program, this first sub-program may be arranged as follows: That is, while the predetermined time T may be changed by operating an adjusting switch, or the like, which is provided around a driver seat, this predetermined time T may be alternatively adjusted by accepting a favorite item of a car driver, a driving skill of a car driver, or the like.

Furthermore, the predetermined time T may be alternatively changed based upon a road source which is indicated by the attribute data of the node. For instance, since this predetermined time T is set to become longer in a vehicle-only road where the degree of attention required to a car driver with respect to a proximity area of the own vehicle are relatively small, this vehicle may properly illuminate a farther area.

Figure 8:
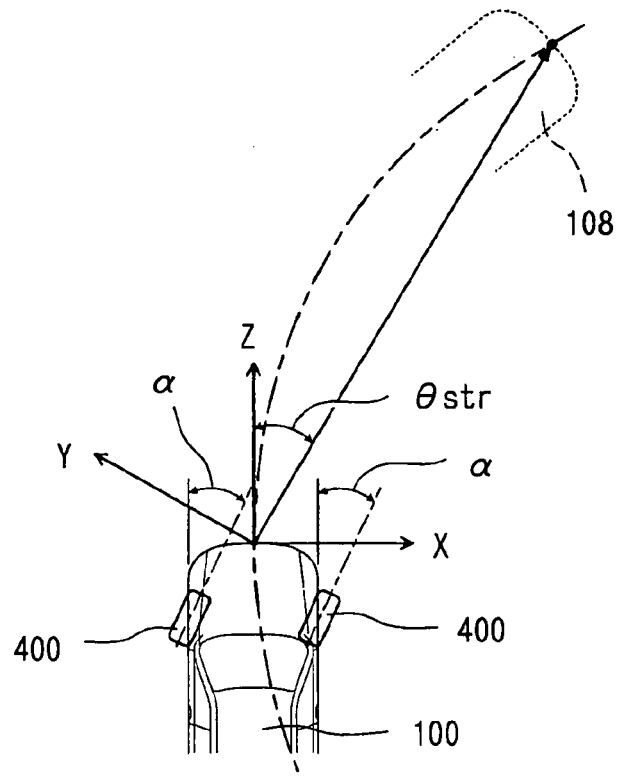
FIG. 8 is an explanatory diagram showing a method of calculating angle θstr executed in the apparatus of the first embodiment.

The second sub-program corresponds to such a calculation routine. That is, a steered angle α of a steered wheel 400 is calculated based upon the steering angle detected by the steering angle sensor 40. Further, a predicted traveling route of the vehicle 100 is calculated in a case that the vehicle 100 travels as shown in FIG. 8, while both this calculated steered angle α and the vehicle speed are maintained.

This second sub-program is arranged in such a manner that an angle θstr is calculated to estimate an angle of travel direction of a vehicle 108 based upon a positional relationship between the vehicle 100 at the present position and the vehicle 108 after the predetermined time T (seconds) has elapsed.

It should also be noted that in this embodiment, the predetermined time of the second sub-program has been set to the same period (3 seconds) as that of the first sub-program. Alternatively, a predetermined time of the first sub-program may be set to be different from a predetermined time of the second sub-program.

The third sub-program corresponds to a program for controlling both the swivel device 11 which adjusts the optical axis of the main light 110 and the swivel device 12 which adjusts the optical axis of the sub-light 120 based upon the angle θnav equal to the calculation result of the first sub-program, and the angle θstr equal to the calculation result of the second sub-program.

Figure 9:
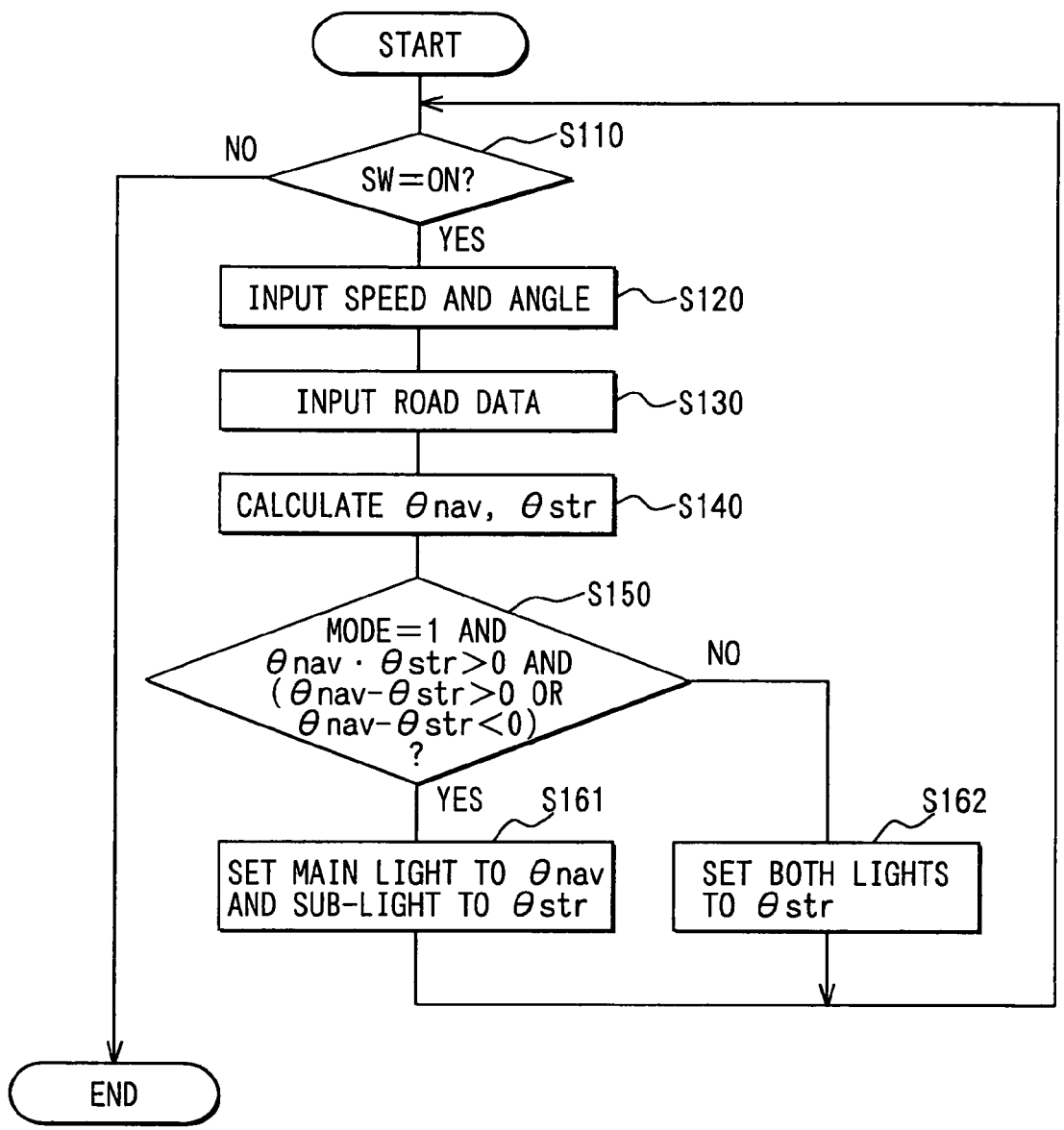
FIG. 9 is a flow chart showing a control operation as to an optical axis of a headlight, executed in the apparatus of the first embodiment.

Next, a light distribution control operation executed by the vehicle headlight apparatus 1 is described with reference to the control flow chart shown in FIG. 9.

A step S110 is for determining whether a light switch indicative of a turn-on state of a headlight is brought into an ON state. If the light switch is brought into the ON state, then the control operation advances to a step S120.

This step S120 is for inputting a vehicle speed from the vehicle speed sensor 50, and a steering angle of the steering wheel 41 from the steering angle sensor 40.

Also, a step S130 is for inputting the road data from the road data output device 20, and also the mode signal for finding whether the vehicle headlight apparatus is operated under route navigation.

A step S140 is for executing both the first sub-program and the second sub-program are executed so as to calculate the angle θnav (FIG. 7) and angle θstr (FIG. 8).

Then, in a step S150, a determining process operation for switching control operations which are applied to the respective swivel devices 11 and 12 is carried out.

The step S150 is arranged as follows: that is, the process operation advances to another step S161 in a case that the mode signal for indicating whether the navigation system 200 is operated under route navigation corresponds to 1 (under route navigation), and furthermore, while positive and negative values of the angle θnav and the angle θstr are identical to each other, θnav−θstr>0 (i.e., a vehicle is entering a right corner, or a vehicle is getting out from a left corner), otherwise, while positive and negative values as to the angle θnav and the angle θstr are identical to each other, θnav−θstr<0 (i.e., a vehicle is getting out from a right corner, or a vehicle is entering a left corner).

When the operation condition is different from the case, the process operation advances to a step S162. It should be understood that in this operation, the angles θnav and θstr are assumed that an angle on the side of a right direction is positive, and a neutral side is a zero.

In a step S161, the one-eye navigation-cooperated control operation is carried out. Specifically, in this step S161, the swivel device 11 is controlled in such a manner that the optical axis of the main light 110 defines the angle θnav with respect to the vehicle axis, and furthermore, the swivel device 12 for the sub-light 120 is controlled in such a manner that the optical axis of the sub-light 120 defines the angle θstr with respect to the vehicle axis.

In the step S162, both swivel devices 11 and 12 are controlled in such a manner that the optical axes of both main light 110 and the sub-light 120 define such an angle θstr with respect to the vehicle axis.

The control operations executed based upon the control flow chart will be described by exemplifying two sorts of road shapes, namely, a J-shaped curve shown in FIG. 10 and an S-shaped curve shown in FIG. 15.

Figure 10:
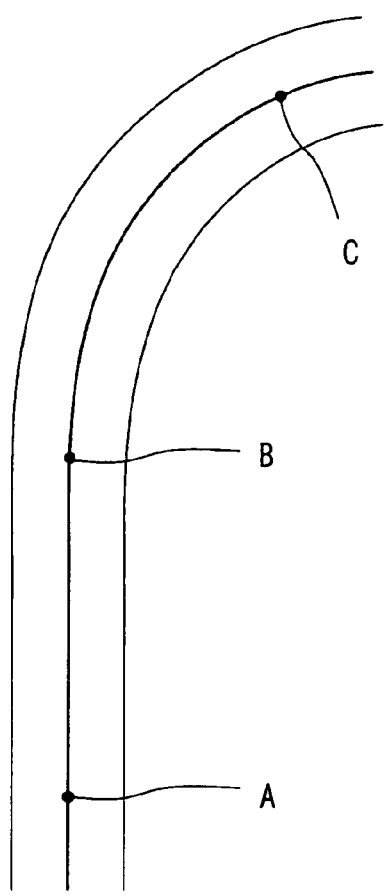
FIG. 10 is an explanatory diagram showing a J-shaped curve used in the first embodiment.

First, as shown in FIG. 10, this J-shaped curve corresponds to such a shaped curve in which a straight section routed from a point A to a point B is combined with a curved section routed from the point B to a point C, while the point B is set as a point of inflection.

Figure 11:
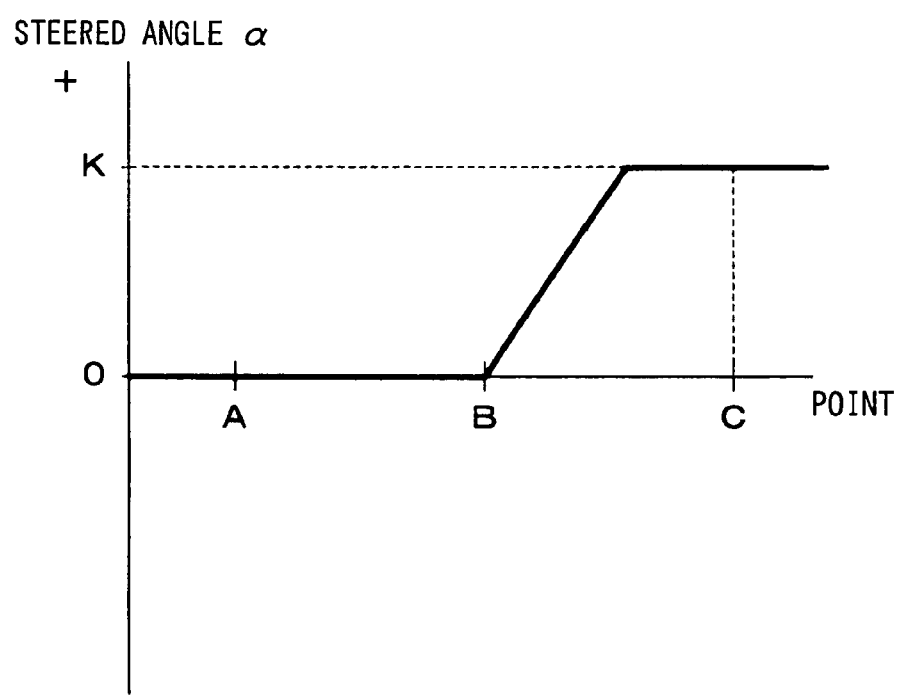
FIG. 11 is a graphic representation showing a change in steering angles with respect to the J-shaped curve used in the first embodiment.

In this case, when the vehicle 100 passes through the J-shaped curve, the steered angle α (FIG. 8) of the steered wheel 400 of this vehicle 100 is changed as shown in FIG. 11. It should also be noted that in FIG. 11, the abscissa indicates a vehicle position on a road, and the ordinate represents a magnitude of the steered angle α, in which this magnitude is indicated as a positive value when the vehicle 100 is turned to the right direction.

As apparently understood from this graph, the steered angle α is kept as a neutral value (zero) within the straight section defined from the point A to the pint B, and this steered angle α gradually becomes large when the vehicle 100 passes through the point B from which the curved section starts, and then this steered angle α takes a constant value K at the point C which represents that the curvature becomes constant.

Figure 13:
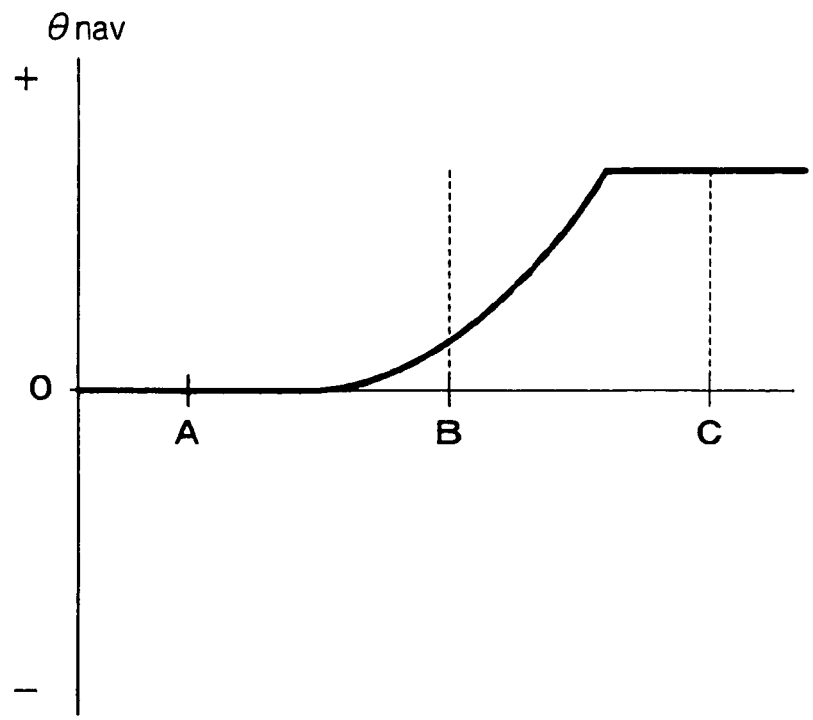
FIG. 13 is an explanatory diagram showing a change in the angle θnav in the J-shaped curve used in the first embodiment.

On the other hand, the angle θnav (FIG. 7) which is calculated by the first sub-program is changed as shown in FIG. 13 when the vehicle 100 passes through the J-shaped curve. It should also be noted that in this graph, the abscissa indicates a vehicle position on a road, and the ordinate represents a magnitude of the angle θnav in which this magnitude is indicated as a positive value when the vehicle 100 is turned to the right direction.

When the vehicle 100 travels between the points A and B, corresponding to the straight section, the light distribution control ECU 30 may acquire the road shape between the points B and C, corresponding to the forward curved section, in advance.

Figure 12:
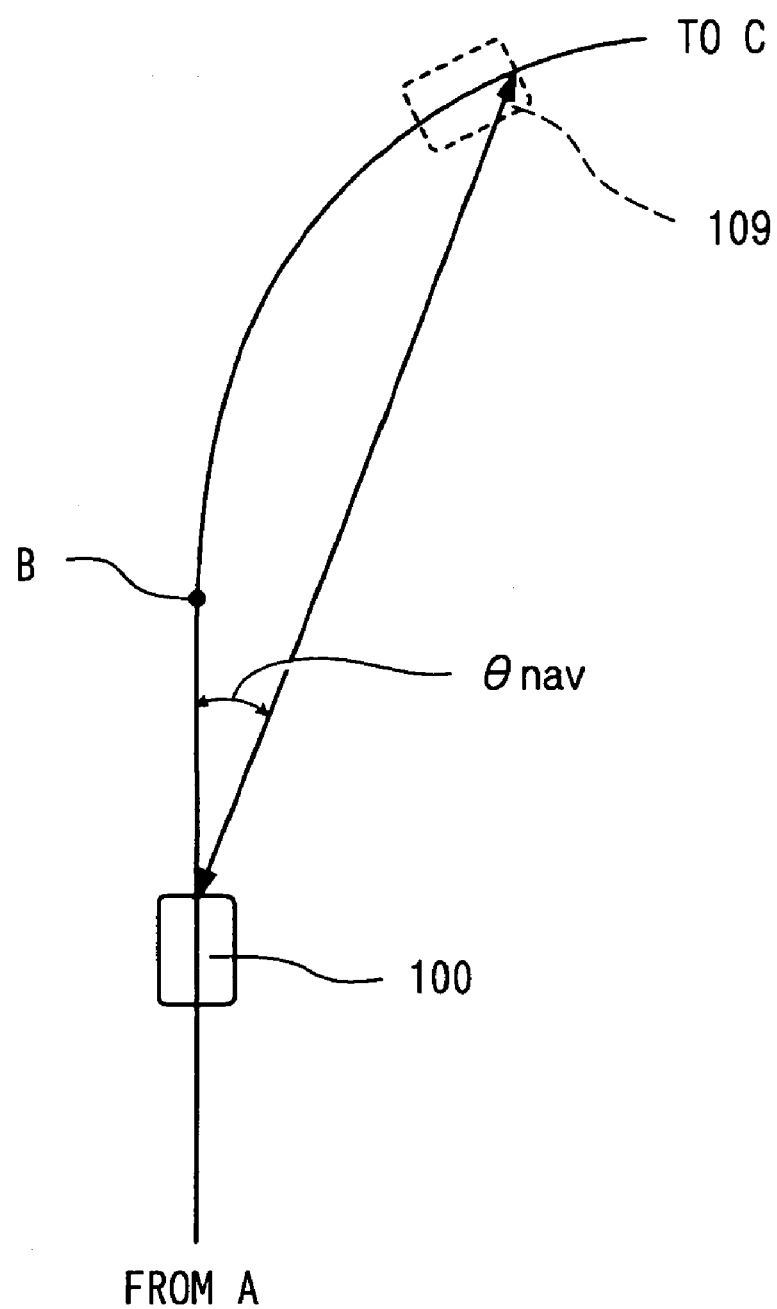
FIG. 12 is an explanatory diagram showing an angle θnav when a vehicle travels between A and B in the first embodiment.

As a consequence, as shown in FIG. 12 and FIG. 13, the angle θnav calculated by the first sub-program indicates a positive value which is larger than the zero at a vehicle position located in front of the point B.

As shown in FIG. 13, at the point C which represents that the curvature becomes constant, this angle θnav represents a constant value similar to the steered angle α.

While the vehicle 100 travels between the points A and C, if the condition is made coincident with the determining condition of the step S150, then the main light 110 is controlled in such a manner that an angle defined between the optical axis of this main light 110 and the vehicle axis is set to the angle θnav in the step S161.

Therefore, as shown in FIG. 13, the optical axis direction of the main light 110 is controlled in such a manner that the direction of this optical axis is directed close to the exit side (namely, side C) of the curve from the position in front of the point B.

On the other hand, the sub-light 120 is controlled in such a manner that an angle between the optical axis of this sub-light 120 and the vehicle angle becomes equal to the angle θstr which is calculated by the second sub-program.

This angle θstr has a high correlation with the steered angle α (FIG. 11) of the steered wheel 400. When the steered angle becomes 0, this angle θstr becomes such an angle having a zero.

Figure 14:
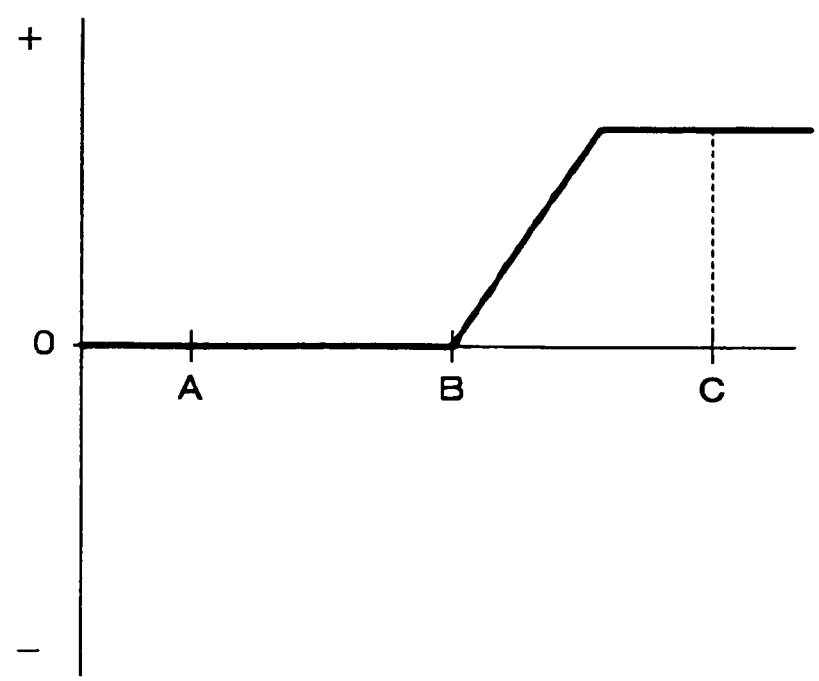
FIG. 14 is an explanatory diagram showing a change in optical axis directions of a sub-headlight in the J-shaped curve used in the first embodiment.

As a consequence, the optical axis of the sub-light 120 is controlled in such a manner that, as shown in FIG. 14, this optical axis is located at a neutral position until the vehicle 100 reaches the point B, and in accordance with such a condition that the vehicle 100 passes through this point B, the angle defined between this optical axis and the vehicle axis is gradually increased (directed to point C).

Figure 15:
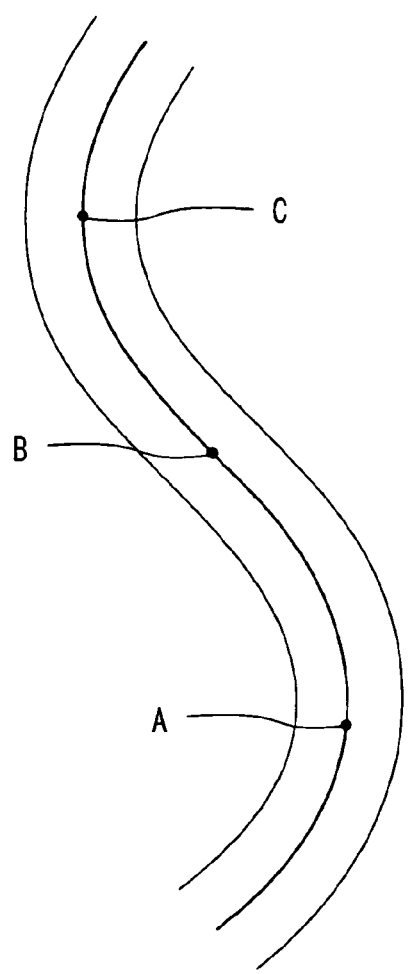
FIG. 15 is an explanatory diagram showing an S-shaped curve used in the first embodiment.

Next, as shown in FIG. 15, the S-shaped curve corresponds to a composite shape. This composite shape is formed by combining a first left corner section which reaches from the point A to the point B with a second right corner section which reaches from the point B to the point C, while the point B is set as a point of inflection.

Figure 16:
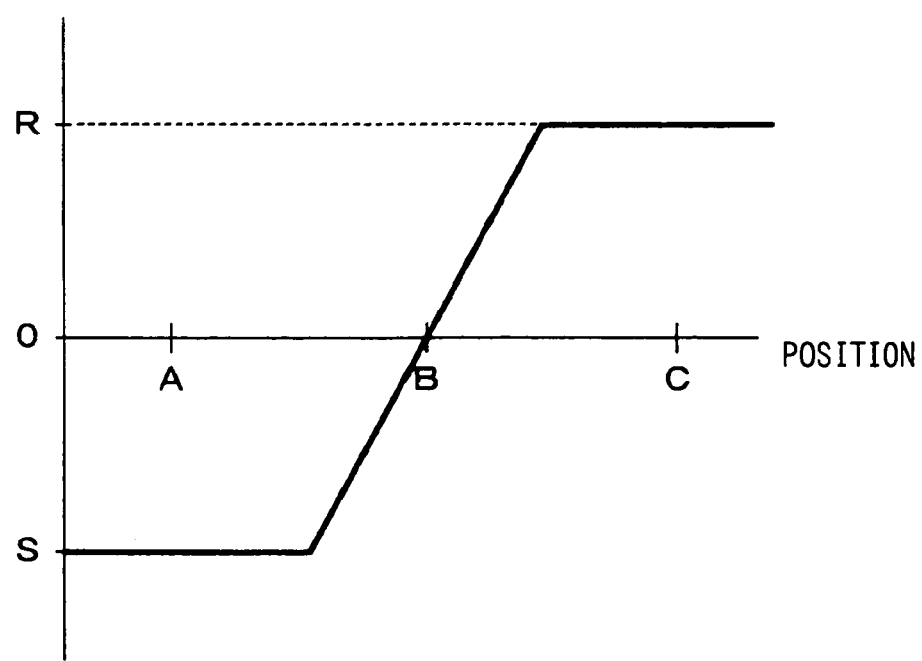
FIG. 16 is a graphic representation showing a change in steering angles with respect to the S-shaped curve used in the first embodiment.

When the vehicle 100 passes through this S-shaped curve, the steered angle α (FIG. 8) of the steered wheel 400 of this vehicle 100 is changed as shown in FIG. 16. It should also be noted that in this graph, the abscissa indicates a vehicle position on a road, and the ordinate represents a magnitude of the steered angle α in which this magnitude is indicated as a positive value when the vehicle 100 turns to the right direction.

In accordance with this graph, the steered angle α represents either a constant value S having a negative value or a constant value R having a positive value in the vicinity of either the point A or the point C, which indicate the constant curvatures. Then, the steered angle α is changed from the negative value to the positive value, where the point B corresponding to the point of inflection is defined as a zero-cross point.

Figure 18:
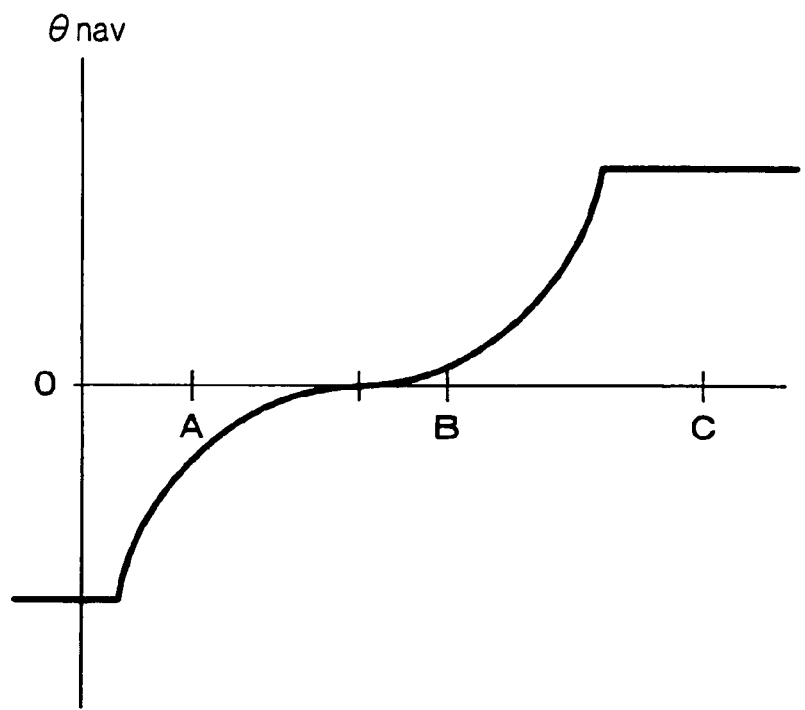
FIG. 18 is an explanatory diagram showing a change in angle θnav in the S-shaped curve used in the first embodiment.

On the other hand, the angle θnav (FIG. 7) which is calculated by the first sub-program is changed as shown in FIG. 18 when the vehicle 100 passes through the S-shaped curve. It should also be noted that in this graph, the abscissa indicates a vehicle position on a road, and the ordinate represents a magnitude of the angle θnav in which this magnitude is indicated as a positive value when the vehicle 100 is turned to the right direction.

When the vehicle 100 travels between the points A and B corresponding to a left corner section, the light distribution control ECU 30 is capable of acquiring a road shape between the points B and C corresponding to a right corner section is advance.

Figure 17:
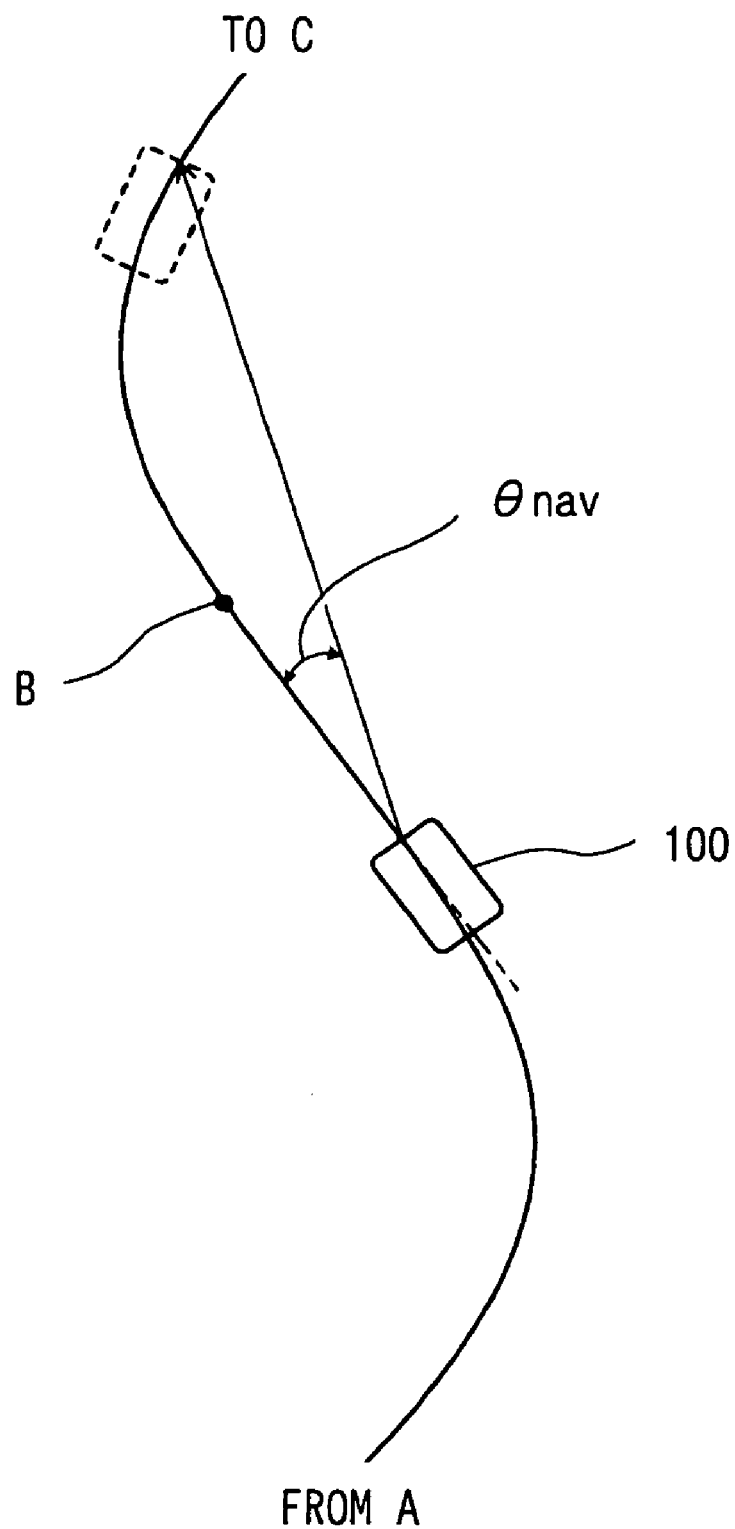
FIG. 17 is an explanatory diagram showing an angle θnav when a vehicle travels between A and B in the first embodiment.

As a consequence, as shown in FIG. 17 and FIG. 18, the angle θnav which is calculated by the first sub-program is inverted from a negative value (on the side of left turn) to a positive value (on the side of right turn) at a position located in front of the point B which corresponds to the point of inflection.

While the vehicle 100 travels between the points A and C, if the condition is made coincident with the determining condition of the step S150, then the main light 110 is controlled in such a manner that the angle defined between the optical axis of this main light 110 and the vehicle axis becomes the angle θnav in the step S161.

Therefore, as shown in FIG. 18, the optical axis direction of the main light 110 is controlled in such a manner that the direction of this optical axis represents a positive value (namely, under such a condition that this direction is inclined with respect to vehicle axis) at the position in front of the point B.

On the other hand, the sub-light 120 is controlled in such a manner that the angle between the optical axis of this sub-light 120 and the vehicle angle becomes equal to the angle θstr which is calculated by the light distribution control ECU 30.

This angle θstr has a high correlation with the steered angle α (FIG. 16) of the steered wheel 400. When the steered angle α becomes 0, this angle θstr corresponds to such an angle necessarily having a zero.

Figure 19:
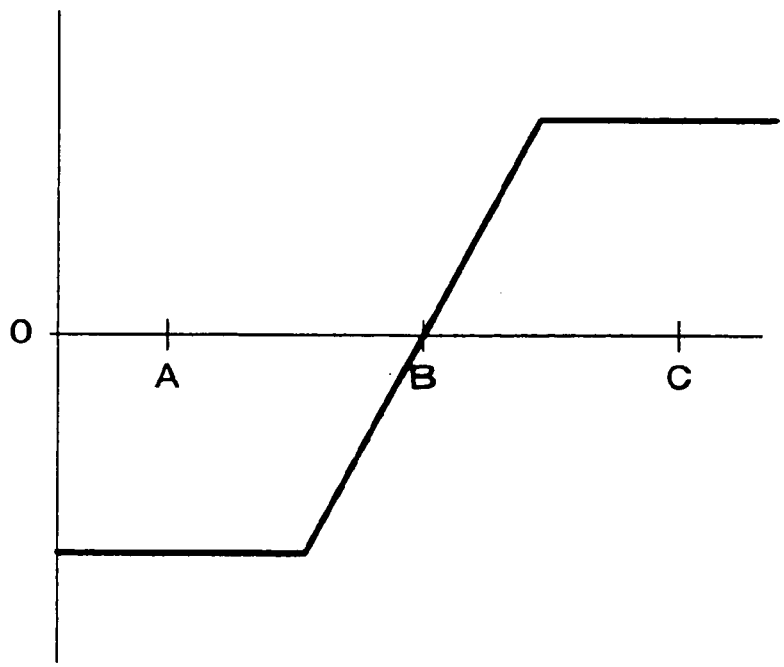
FIG. 19 is an explanatory diagram showing a change in optical axis directions of the sub-headlight in the S-shaped curve used in the first embodiment.

As a consequence, the optical axis direction of the sub-light 120 is controlled in such a manner that, as shown in FIG. 19, an angle of this optical axis direction with respect to the vehicle axis at the point B becomes zero, and angle values are inverted in positive and negative values before and after this point B.

The optical axis adjusting range of the respective headlights 110 and 120 are set to both sides, while the vehicle axis is set to the center. Alternatively, the respective optical axis adjusting ranges of the headlights 110 and 120 may be set only to the outer side from the central axis direction which is located in parallel to the vehicle axis.

Figure 20:
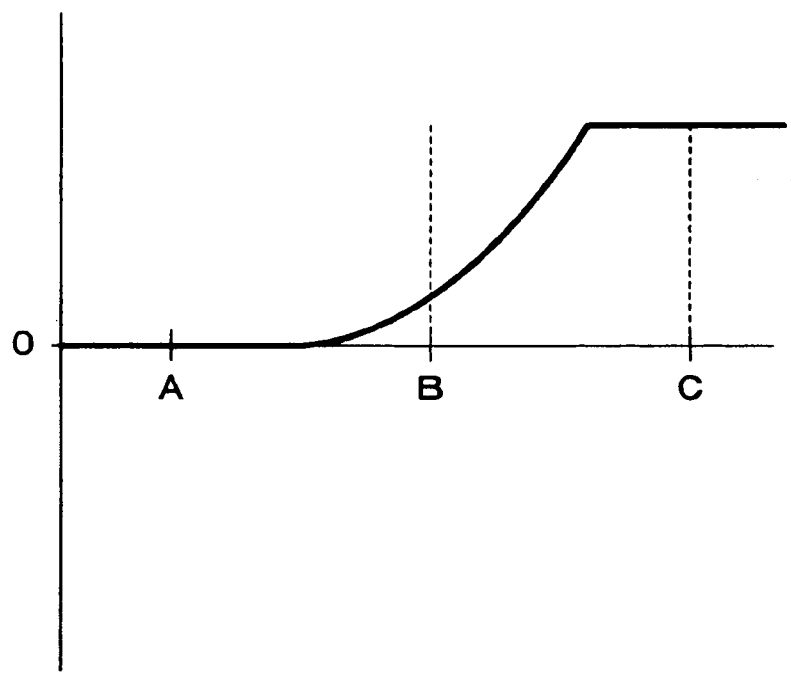
FIG. 20 is an explanatory diagram showing a change in optical axis directions of a main headlight in the J-shaped curve by way of another control operation in the first embodiment.
Figure 21:
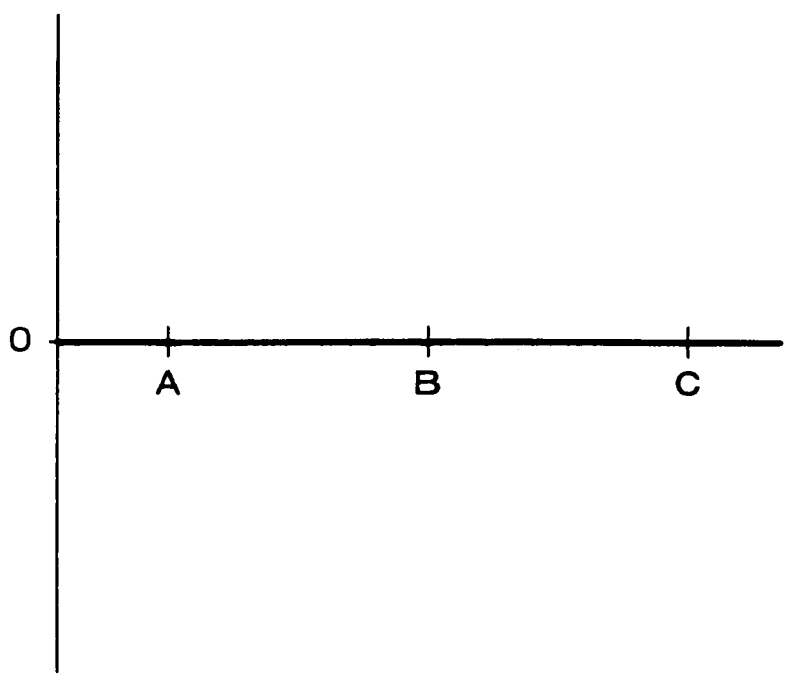
FIG. 21 is an explanatory diagram showing a change in optical axis directions of the sub-headlight in the J-shaped curve by way of another control operation in the first embodiment.
Figure 22:
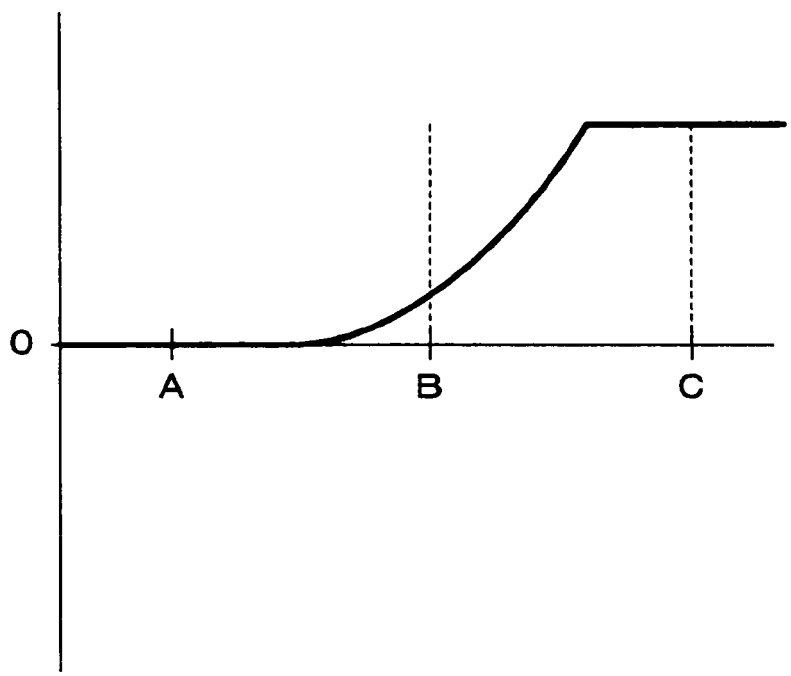
FIG. 22 is an explanatory diagram showing a change in optical axis directions of the main headlight in the S-shaped curve by way of another control operation in the first embodiment.
Figure 23:
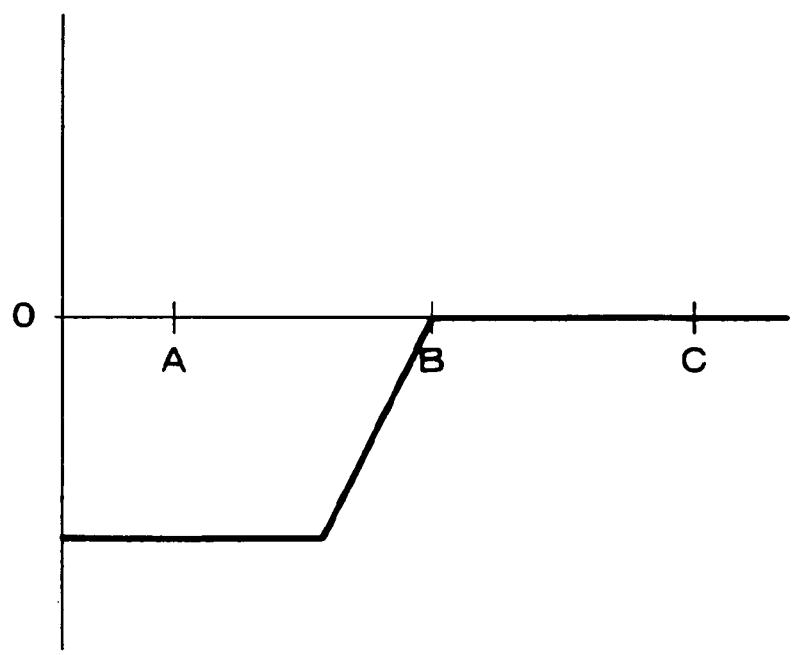
FIG. 23 is an explanatory diagram showing a change in optical axis directions of the sub-headlight in the S-shaped curve by way of another control operation in the first embodiment.

In this alternative case, the optical axis of the main light 110 is controlled as indicated in FIG. 20 (J-shaped curve) and FIG. 22 (S-shaped curve), and the optical axis of the sub-light 120 is controlled as shown in either FIG. 21 (J-shaped curve) or FIG. 23 (S-shaped curve).

Furthermore, in this embodiment, the main light 110 is fixed to the headlight provided on the side of the opposite lane. Alternatively, such a control operation may be carried out by properly switching the main light and the sub-light in order that such a headlight arranged inside a curved direction of a forward curve may become this main light.

Second Embodiment

Figure 24:
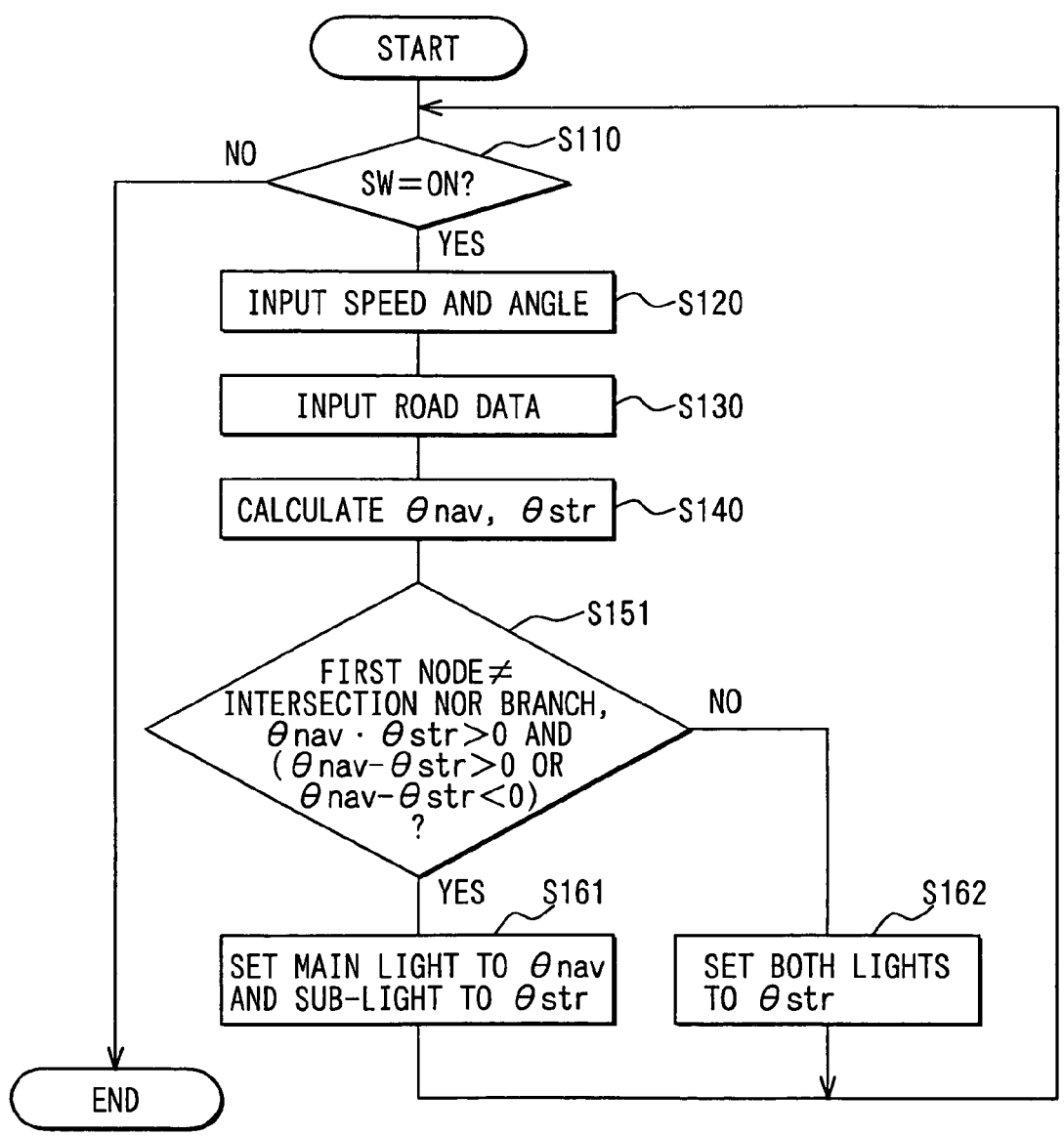
FIG. 24 is a flow chart showing a control operation as to an optical axis of a headlight executed in an apparatus according to a second embodiment of the present invention.

In the second embodiment, a determination whether the navigation-cooperated control operation is carried out is changed as shown in FIG. 24. In this embodiment, the step S150 of the first embodiment is replaced by a step S151. That is, the step S151 is arranged to refer to the attribute data of the first node.

In this step S151, the process operation is arranged as follows: that is, a one-eye navigation-cooperated control operation (defined in step S161) similar to that of the first embodiment is carried out in a case that the first node owns such an attribute data other than intersection and branch road, and furthermore, while positive and negative values as to the angle θnav and the angle θstr are identical to each other, such a condition is satisfied, i.e., θnav−θstr>0 (when a vehicle enters a right corner, or a vehicle gets out from a left corner), otherwise, while positive and negative values as to the angle θnav and the angle θstr are identical to each other, such a condition is satisfied, i.e., θnav−θstr<0 (when a vehicle gets out from a right corner, or a vehicle enters a left corner). In the case other than the case, a non-navigation-cooperated control operation (step S162) is carried out.

Thus, the vehicle headlight apparatus 1 is arranged in such a manner that the navigation-cooperated control operation is interrupted in order to avoid an erroneous control operation in advance, if the attribute of the first node corresponds to an intersection or a branch road and a plurality of candidates as to the second nodes and the second arcs can be present. Other arrangements and operation effects of the second embodiment are similar to those of the first embodiment.

Third Embodiment

In the third embodiment, two sorts of navigation-cooperated control operations are switched. That is, a one-eye navigation-cooperated control operation for controlling only a main light in response to the angle θnav, and a two-eye navigation-cooperated control operation for controlling headlights mounted on both sides in response to the angle θnav are switched.

The vehicle headlight apparatus 1 of this third embodiment is constructed as follows: two sorts of the navigation-cooperated control operations are selectively carried out based upon attribute data indicative of a sort of a road among the road data in the navigation-cooperated control operation.

Figure 25:
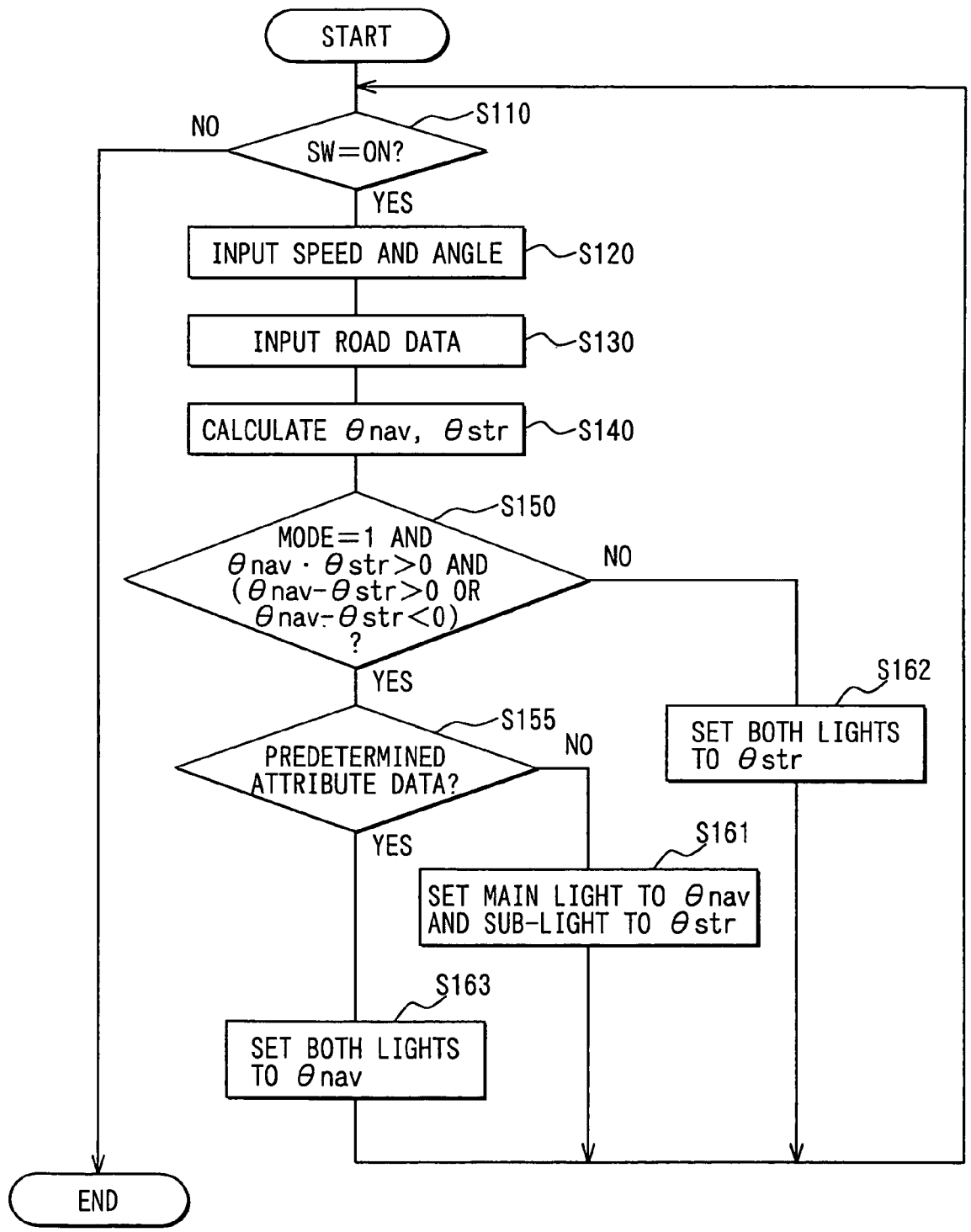
FIG. 25 is a flow chart showing a control operation as to an optical axis of a headlight executed in an apparatus according to a third embodiment of the present invention.

This control flow chart is arranged as shown in FIG. 25. After a determination step of a step S150 similar to that of the first embodiment, a process operation in a step S155 is further executed which determines whether the attribute data is contained in a predetermined road sort group.

Then, when the attribute data indicates the predetermined road sort in the step S155, the control operation advances to a step S163 in which the two-eye navigation-cooperated control operation is carried out. In this step S155, the swivel devices 11 and 12 are controlled in such a manner that angles between the vehicle axis and the optical axes of the both headlights 110 and 120 form an angle θnav.

On the other hand, in a case that the sort data is not a data which indicates the predetermined road sort, the process operation advances to a step S161 in which the one-eye navigation-cooperated control operation is carried out. In this step S161, similar to the navigation-cooperated control operation of the first embodiment, only the main light 110 of the two headlights is controlled in accordance with the angle θnav, and the sub-light 120 is controlled in accordance with the angle θstr.

In this case, as the predetermined road sort, in this third embodiment, a toll road, a vehicle-only road, or a national road are previously set, by which higher positional precision of electronic map information can be expected.

It should also be noted that other structures and operation effects of this third embodiment are similar to those of the first embodiment.

Fourth Embodiment

In the fourth embodiment, the condition for switching the one-eye navigation-cooperated control operation and the two-eye navigation-cooperated control operation is from the third embodiment.

Figure 26:
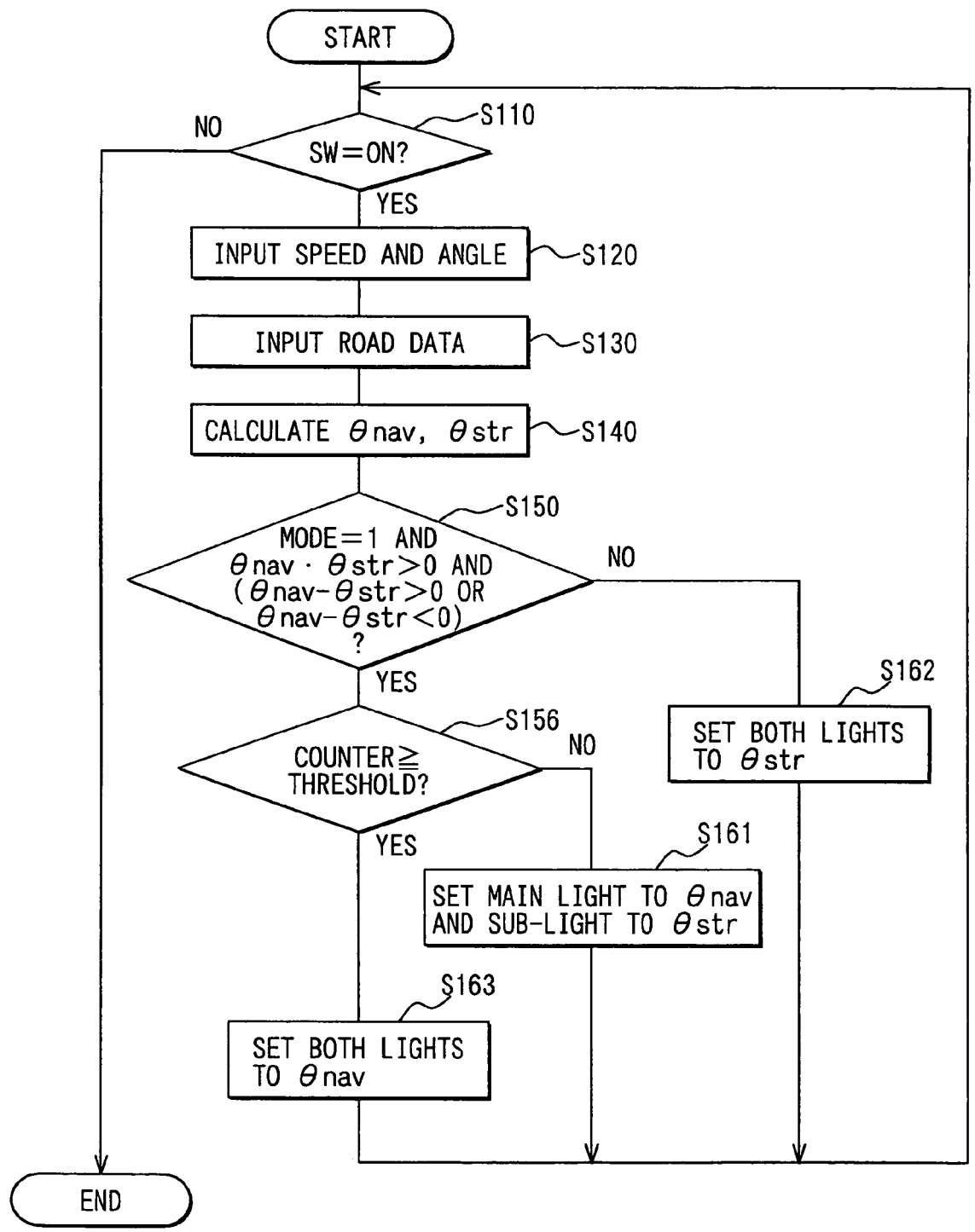
FIG. 26 is a flow chart showing a control operation as to an optical axis of a headlight executed in an apparatus according to a fourth embodiment of the present invention.

In this fourth embodiment, as shown in FIG. 26, a process operation defined in a step S156 is carried out instead of the process operation defined in the step 155 of the third embodiment.

Also, the navigation system 200 of this fourth embodiment owns a map updating function used to improve positional precision of electronic map information which are stored in the map database 22.

This map updating function corresponds to such a function that the positional data of the respective nodes contained in the electronic map information are arbitrarily corrected based upon such a positional information which is acquired while the vehicle 100 actually travels, and the positional data are updated so as to improve the precision thereof.

Then, the map updating function is arranged in such a way that every time the positional data of each of the nodes is updated, an update counter which has been set in the attribute data of each of the nodes is counted up.

The step S156 corresponds to such a step for determining whether a count value of the update counter is larger than or equal to a predetermined number which has been previously set.

In the case that the determining condition of the step S156 is satisfied, the process operation advances to a step S163. In this step S163, the two-eye navigation-cooperated control operation for controlling both the main light 110 and the sub-light 120 based upon the angle θnav is carried out.

On the other hand, in the case that the determining condition of the step S156 is not satisfied, the process operation advances to a step S161. In this step S161, the one-eye navigation-cooperated control operation for controlling only the main light 110 based upon the map data is carried out.

As described above, the vehicle headlight apparatus 1 of this fourth embodiment is arranged such that both the main light 110 and the sub-light 120 are controlled in accordance with the angle θnav only in the case that precision of positional data contained in the electronic map information is high.

In this case, the map updating function of the vehicle headlight apparatus 1 is arranged in such a way that the positional data of the electronic map information is updated based upon the positional information which is acquired while the vehicle 100 practically travels so as to improve the precision thereof.

It should also be noted that other structures and operation effects of this fourth embodiment are similar to those of the third embodiment.

Alternatively, the map updating function may be realized by such a function capable of acquiring high-precision positional information from an external map database center, or the like via a communication means such as a portable telephone.

In this alternative case, in the step S156, such a determination for determining whether positional information is acquired from an external source as to a subject node may be carried out.

Fifth Embodiment

In the fifth embodiment, both the main light and the sub-light are controlled to be switched in response to a drive condition as shown in FIG. 27 to FIG. 37.

Figure 27:
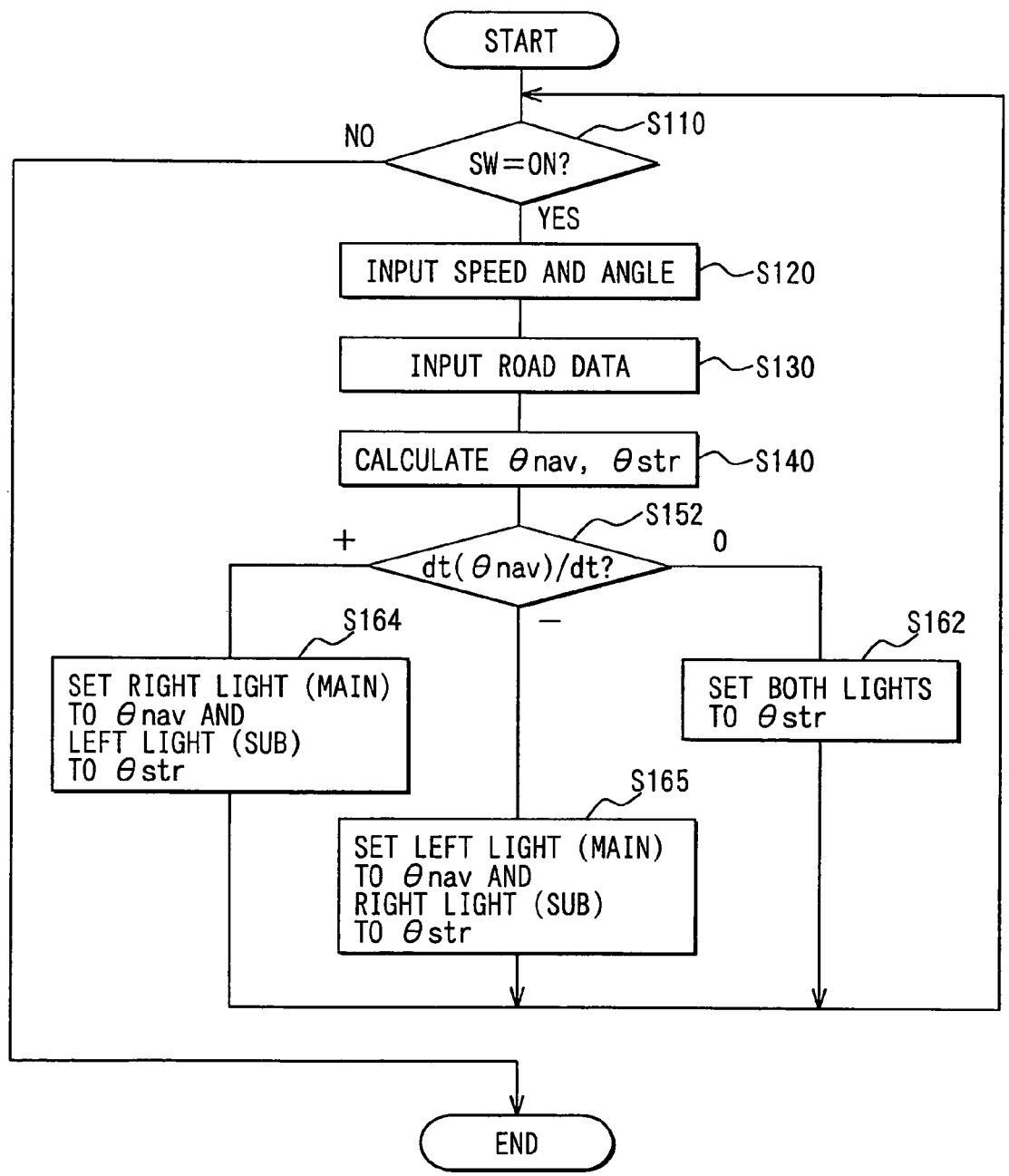
FIG. 27 is a flow chart showing a control operation as to an optical axis of a headlight executed in an apparatus according to a fifth embodiment of the present invention.

Referring to a flow chart of FIG. 27, a selection is made between a navigation-cooperated control operation (either step S164 or step S165) and a non-navigation-cooperated control operation (step S162), which are executed in response to such a value of d(θnav)/dt corresponding to a time differentiation of the angle θnav. Also, a switching operation is carried out between the main light and the sub-light (step S164 and Step S165).

This control operation will now be described with reference to two sorts of road shapes, namely, a right corner shown in FIG. 28 and an S-shaped curve shown in FIG. 33. It should be understood that the control operation defined in a step S152 of this fifth embodiment is constructed as follows: that is, while employing such an initial condition that a permission signal similar to the first embodiment is equal to 1, a condition determination is carried out. Also, in the case that the permission signal is equal to any number other than 1, the control operation advances to the step S162.

Figure 28:
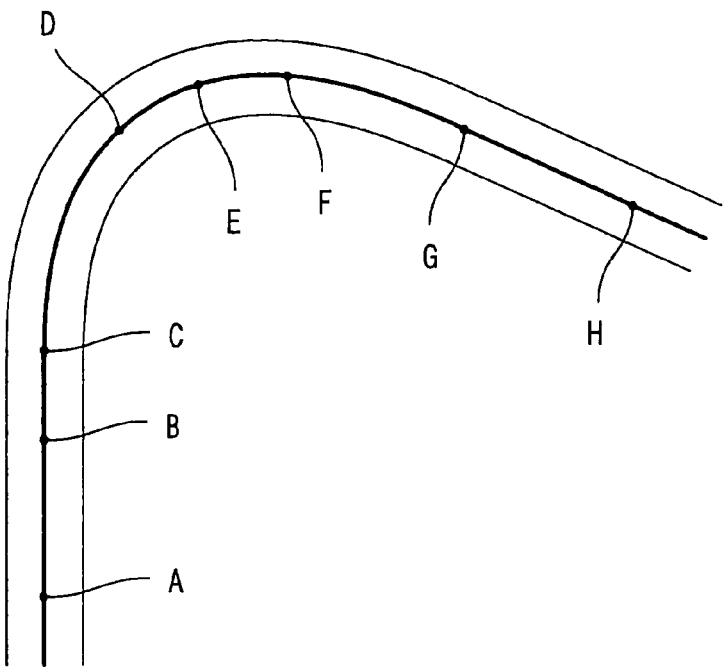
FIG. 28 is an explanatory diagram showing a right corner used in the apparatus of the fifth embodiment.

As shown in FIG. 28, the right corner corresponds to a road shape of a right curve which is made by combining a straight section defined from a point A to a point C, a curved section defined from the point C to a point G, and another straight section defined from the point G to a point H. It should also be noted that within the curved section, a section defined from the point D to a point F is such a section which represents a constant curvature, whereas sections defined from the point C to the point D and from the point F to the point G, which are located preceding to or following the constant curvature section, correspond to gradually changing curvature sections whose curvatures are gradually changed.

Figure 29:
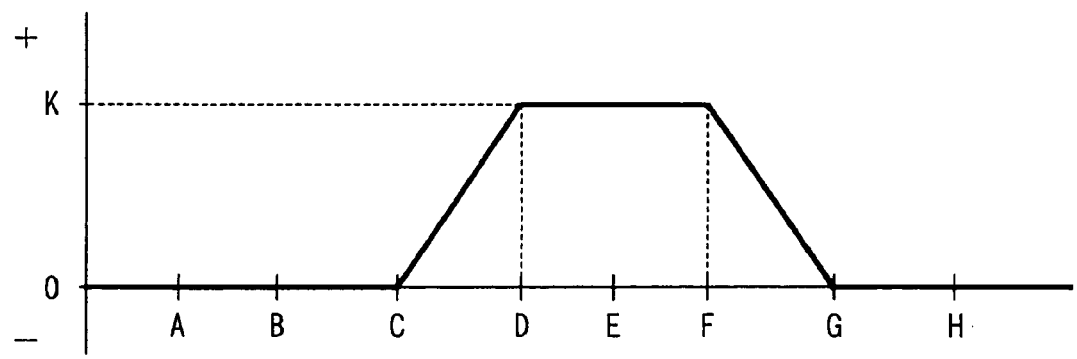
FIG. 29 is a graphic representation showing changes in steered angles and angle θstr in the right corner used in the apparatus of the fifth embodiment.

When the vehicle 100 travels over this right corner, the steered angle α (FIG. 8) of the steered wheel 400 of the vehicle 100 is changed as shown in FIG. 29. It should be understood that in this figure, the abscissa indicates a vehicle position on a road, and the ordinate represents a magnitude of the steered angle α in which this magnitude is indicated as a positive value when the vehicle 100 turns to the right direction.

Specifically, the steered angle α is kept to a neutral value (zero) within the straight section defined from the point A to the point C, and is gradually increased within a section after the point C from which the curved section starts until the point D. Then, this steered angle α becomes α=K, namely substantially constant within the section defined from the point D to the point F. Thereafter, within a section between the point D and the point F after the vehicle 100 passes through the constant curvature section (point D to point F), the steered angle α is gradually decreased, and becomes the neutral value (zero) within the straight section defined from the point G to the point H.

As described in the first embodiment, it should be noted that this steered angle α has a high correlation with the angle θstr (FIG. 8) which is calculated based upon the second sub-program.

Figure 30:
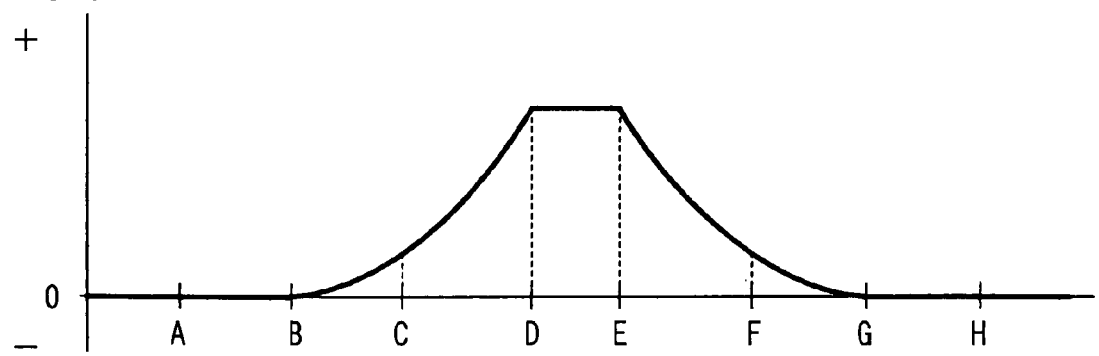
FIG. 30 is a graphic representation showing a change in angle θnav in the right corner used in the apparatus of the fifth embodiment.

On the other hand, the angle θnav (FIG. 7) which is calculated based upon the first sub-program similar to that of the first embodiment is changed as shown in FIG. 30 in the right corner. It should be also understood that in this figure, the abscissa indicates a vehicle position on a road, and the ordinate represents a magnitude of the angle θnav in which this magnitude is indicated as a positive value when the vehicle 100 turns to the right direction.

In this case, the light distribution control ECU (FIG. 1) which calculates the angle θnav is operated as follows. That is, when the vehicle 100 reaches to the point B located in front of the point C (namely, position of vehicle 100 when the predetermined time T=3 seconds goes back in time from such a time instant that vehicle 100 reaches point C), which is equal to the terminal point of the straight section, this light distribution control ECU acquires a road shape of such a curved section which is located in front of the point C. Also similar to the above case, when the vehicle 100 reaches the point E located in front of the point F (namely, position of vehicle 100 prior to predetermined time T=3 seconds), which is equal to the terminal point of the section whose curvature is constant, the light distribution control ECU acquires a road shape of a curved line changing section located before the point F.

To this end, as shown in FIG. 30, an angle θnav which is calculated by the first sub-program is gradually increased until the vehicle 100 passes through the point B in front of the point C and then reaches the point D, namely corresponding to the starting point of the constant curvature section. Then, the angle θnav becomes substantially constant after the vehicle 100 passes through the point D, namely corresponding to the starting point of the constant curvature section. Thereafter, this angle θnav is gradually decreased after the vehicle 100 passes through the point E located in front of the point F, namely corresponding to the end point of the constant curvature section. Subsequently, the angle θnav becomes a neutral value (zero) when the vehicle 100 reaches the point G, namely corresponding to the starting point of the straight section.

Figure 31:
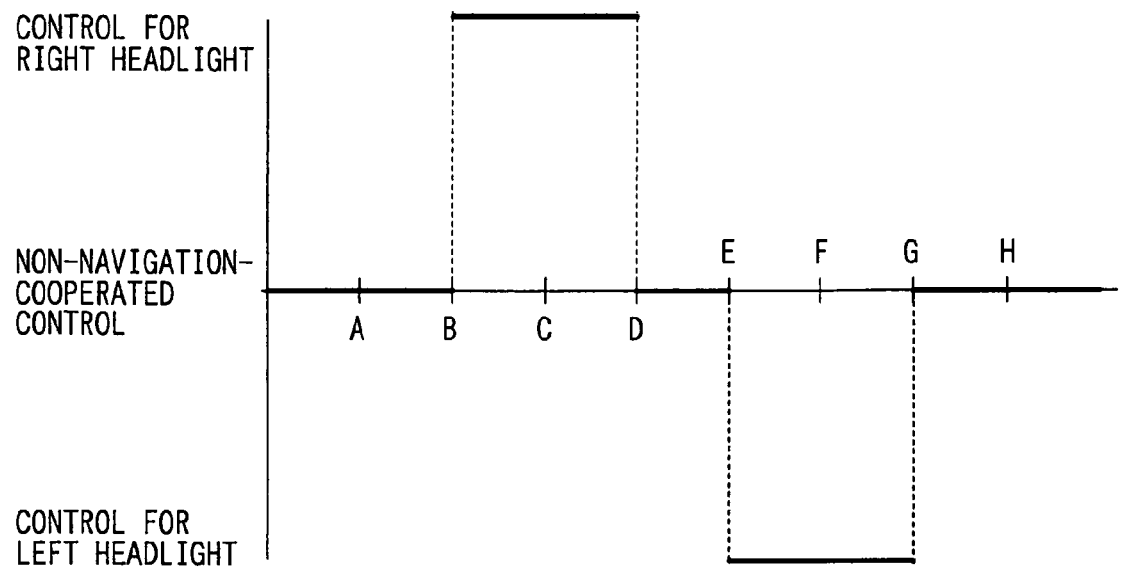
FIG. 31 is a graphic representation showing a condition of control operations in the right corner used in the apparatus of the fifth embodiment.

In this fifth embodiment, while the vehicle 100 travels through the right corner (FIG. 28) constructed with the point A to the point H, the control operation of the vehicle headlight apparatus is carried out in accordance with the control flow chart shown in FIG. 27. Specifically, the vehicle headlight apparatus determines a magnitude of d(θnav)/dt equal to the time differentiated value of the angle θnav in the step S152, and in response to this determination result, a control operation whether the navigation-cooperated control operation is carried out (steps S162, S164 and S165), and another control operation as to which one of the two headlights should be selected as the main light. The control operation executed while the vehicle 100 travels through the right corner defined from the point A to the point H shown in FIG. 28 is shown in FIG. 31. It should also be noted that in this figure, the abscissa defines a vehicle position on a road, and the ordinate indicates three control conditions. In this figure, a control condition one-eye navigation-cooperated control operation executed while right headlight is employed as main light located at an upper position indicates the control operation defined in the step S164 of FIG. 27. Also, a control condition one-eye navigation-cooperated control operation executed while left headlight is employed as the main light located at a lower position indicates the control operation defined in the step S165 of FIG. 27. Further, a non-navigation-cooperated control operation located at an intermediate position indicates the control operation defined in the step S162 of FIG. 27.

As shown in FIG. 30 and FIG. 31, within the section defined from the point A to the point B, the angle θnav maintains a neutral value (zero). Since d(θnav)/dt is also zero within this section, the process operation advances to the step S162 (FIG. 27) in which the navigation-cooperated control operation is stopped. In this step S162, both the optical axis of the right-sided headlight and the optical axis of the left-sided headlight are adjusted in such a manner that this angle becomes substantially coincident with the steering angle θstr which is calculated by the second sub-program.

Figure 32:
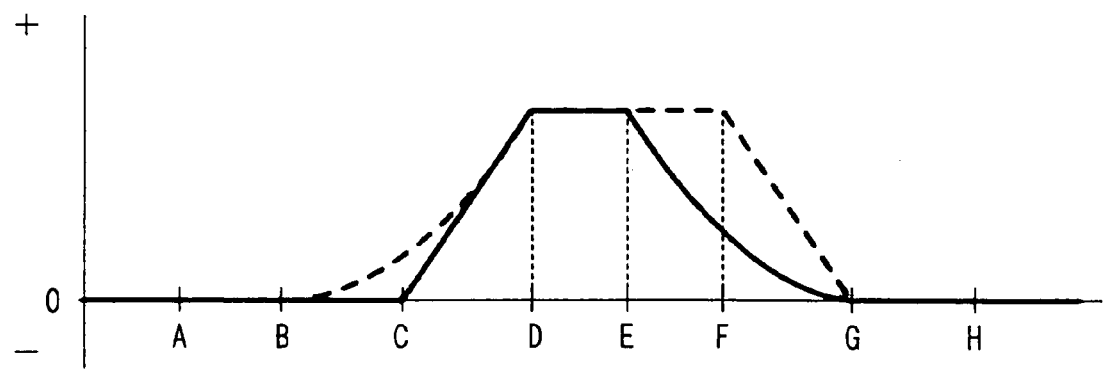
FIG. 32 is a graphic representation showing changes in optical axis angles of right and left headlights in the right corner used in the apparatus of the fifth embodiment.

As a consequence, as indicated in FIG. 32, within the road section from the point A to the point B, the optical axis directions of the right headlight and the left headlight are adjusted to the angle θstr of the section defined between the point A and the point B in FIG. 29, namely adjusted to a neutral value (zero). In FIG. 32, the abscissa defines a position of a road traveling direction, and the ordinate defines such an optical axis angle that a right direction is expressed as a positive value, and a broken line shows an optical axis angle of the right headlight. Also, a solid line indicates an optical axis angle of the left headlight.

As shown in FIG. 30, the angle θnav is increased with a gradually increasing change rate in the section defined between the point B and the point D. At this time, since d(θnav)/dt has a positive value, the process operation moves to a step S164. In this step S164, as shown in FIG. 31 and FIG. 32, the main light is set to the right headlight and is adjusted in such a way that the optical axis direction thereof becomes an angle θnav (namely, angle θnav of section between point B and point D in FIG. 30), and also, the sub-light is set to the left headlight and is adjusted in such a way that the optical axis direction thereof becomes an angle θstr (namely, angle θstr of section between point B and point D in FIG. 29).

As shown in FIG. 30, in the section defined between the point D and the point E, the angle θnav again maintains a substantially constant value. At this time, since d(θnav)/dt becomes zero, the process operation advances to a step S162. In this step S162, as shown in FIG. 31 and FIG. 32, the optical axis directions of the right/left-sided headlights are adjusted in such a manner that the angle is made substantially coincident with the steering angle θstr (namely, steering angle θstr of section defined between point D and point E in FIG. 29) which is calculated by the second sub-program.

Furthermore, as shown in FIG. 30, the angle θnav is decreased with a gradually decreasing change rate in the section defined between the point E and the point G. At this time, since d(θnav)/dt is a negative value, the process operation moves to the step S165. In this step S165, as indicated in FIG. 31 and FIG. 32, the main light is set to the left headlight and is adjusted in such a way that the optical axis direction thereof becomes an angle θnav (namely, angle θnav of section between point E and point G in FIG. 30). Also, the sub-light is set to the right headlight and is adjusted in such a way that the optical axis direction thereof becomes an angle θstr (namely, angle θstr of section between point E and point G in FIG. 29).

Then, in the subsequent straight section defined between the point G and the point H, since d(θnav)/dt becomes zero, the process operation advances to the step S162. In this step S162, as shown in FIG. 31 and FIG. 32, the optical axis directions of the right/left-sided headlights are adjusted in such a manner that the angle is made substantially coincident with the steering angle θstr (namely, steering angle θstr of section defined between point G and point H in FIG. 29) which is calculated by the second sub-program.

In accordance with the above control operation, in the right corner shown in FIG. 28, when the vehicle 100 enters the right corner (namely, section defined between point B and point D), the right headlight 110 corresponding to an inside of this right corner is set as the main light. Then, when the vehicle 100 passes through the right corner (namely, section defined from point E and point G), the left headlight 120 corresponding to an outside of the right corner is set as the main light. Then, the navigation-cooperated control operation as to the optical axis direction of the main light is carried out in the respective cases.

Figure 33:
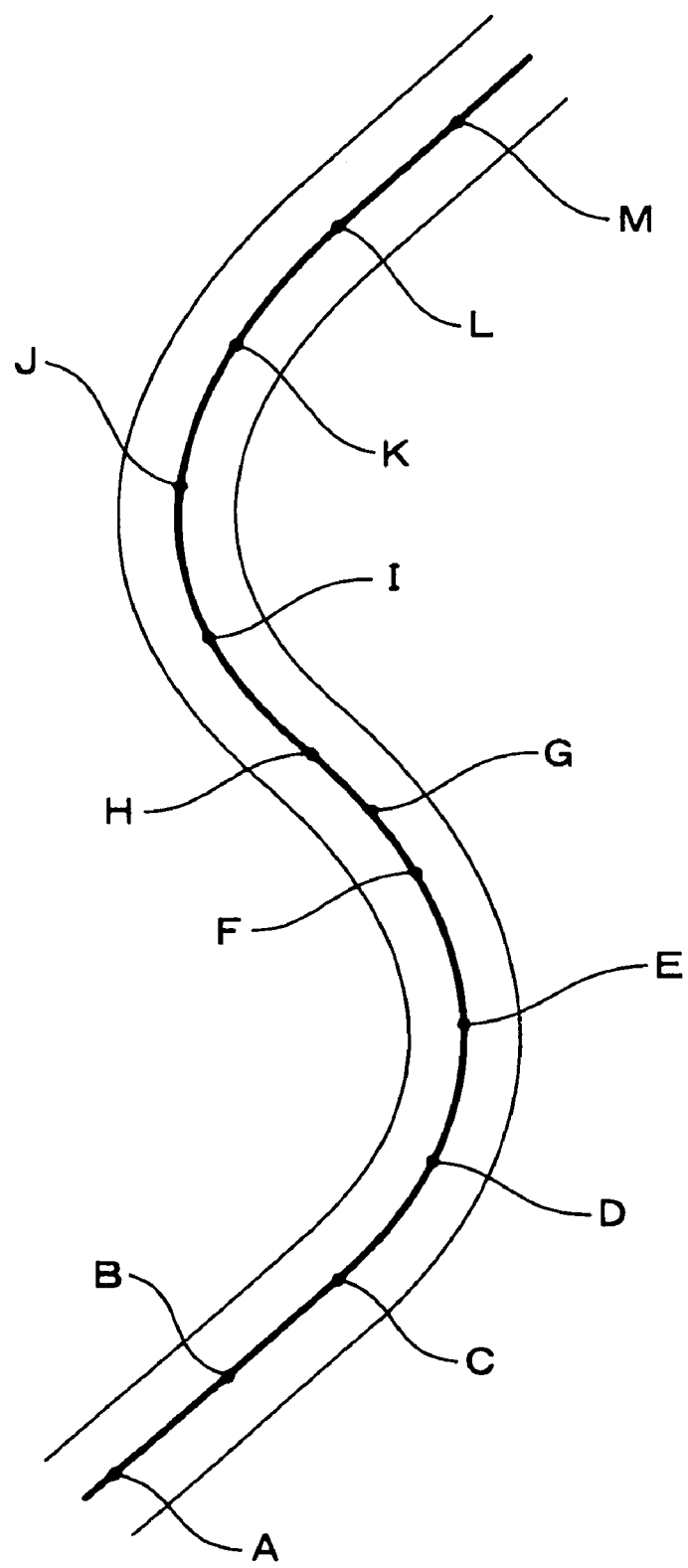
FIG. 33 is an explanatory diagram showing an S-shaped curve used in the apparatus of the fifth embodiment.

Next, it is assumed that the vehicle 100 enters an S-shaped curve defined from a point A up to a point M as indicated in FIG. 33. As shown in this figure, the S-shaped curve is formed by coupling a left corner section defined between a point C and a point H with a right corner section defined between the point H and a point L by an inflection point H. Further, a straight section defined from the point A to the point C, and another straight section defined from the point L to the point M are connected to both end sides of the corner sections.

It should be understood that in this S-shaped curve, a section defined between the point D and the point F corresponds to such a section which represents a substantially constant curvature, whereas both a section defined between the point C and the point D and another section defined between the point F and the point H correspond to gradually changing curvature sections whose curvatures are gradually changed among the point C to the point H corresponding to the left corner section. It should also be understood that in this S-shaped curve, a section defined between the point I and the point K corresponds to such a section which represents a substantially constant curvature. Both a section defined between the point H and the point I and another section defined between the point K and the point L correspond to gradually changing curvature sections whose curvatures are gradually changed among the point H to the point L corresponding to the right corner section.

Figure 34:
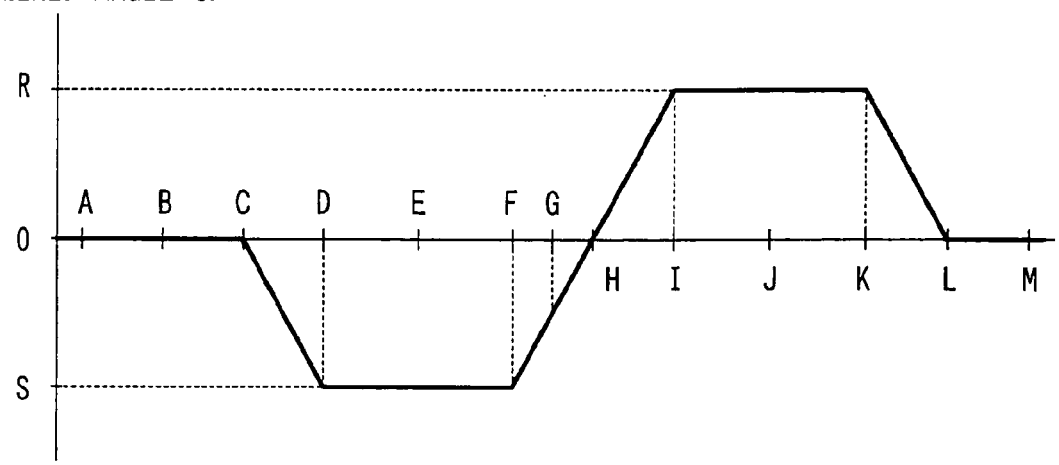
FIG. 34 is a graphic representation showing changes in steered angles and angle θstr in the S-shaped curve used in the apparatus of the fifth embodiment.

When the vehicle 100 travels over the S-shaped curve, the steered angle α (FIG. 8) of the steered wheel 400 of the vehicle 100 is changed as shown in FIG. 34. It should be understood that in this figure, the abscissa indicates a vehicle position on a road, and the ordinate represents a magnitude of the steered angle α in which this magnitude is indicated as a positive value when the vehicle 100 turns in the right direction.

The steered angle α is kept to a neutral value (zero) within the straight section defined from the point A to the point C, and is gradually decreased within a section after the point C from which the curved section starts until the point D. Then, this steered angle α becomes α=S, namely substantially constant within the section defined from the point D to the point F. Thereafter, within a section between the point F and the point H after the vehicle 100 passes through the constant curvature section (point D to point F), the steered angle α is gradually increased, and becomes zero within the straight section-defined from at the point H which is equal to the inflection point where the section is transferred to the right corner section. This inflection point H becomes a zero-cross point.

Thereafter, in the section defined between the point H and the point I, the steered angle α exceeds zero and is further increased in continuation to the forward section defined between the point F and the point H. Then, in the constant curvature section between the point I to the point K, the steered angle α becomes equal to R, namely a substantially constant steered angle. Thereafter, within a section between the point K and a point L after the vehicle 100 passes through the constant curvature section (point I to point K), the steered angle α is gradually decreased, and again becomes a neutral value (zero) within the straight section defined from the point L to a point M.

In the fourth embodiment, it should be noted that this steered angle α has a high correlation with the angle θstr (FIG. 8) which is calculated based upon the second sub-program.

Figure 35:
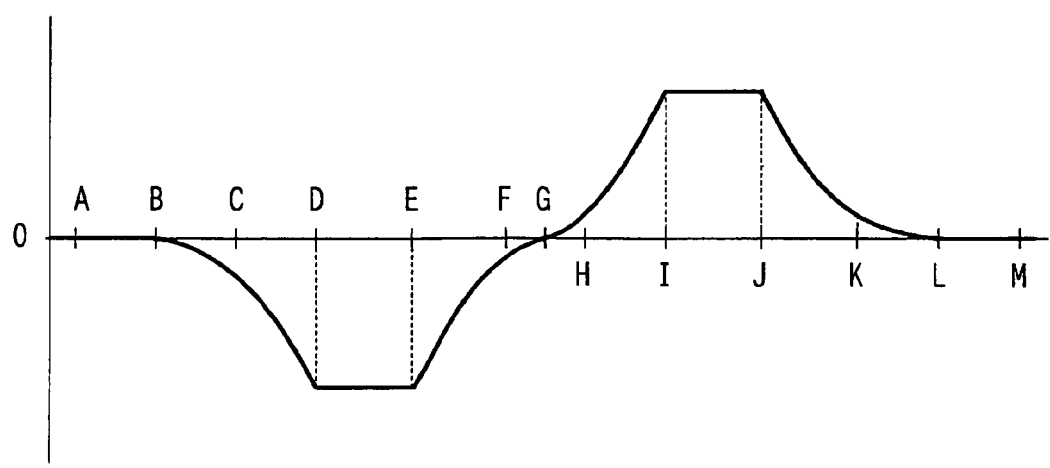
FIG. 35 is a graphic representation showing a change in angle θnav in the S-shaped curve used in the apparatus of the fifth embodiment.

On the other hand, the angle θnav (FIG. 7) which is calculated based upon the first sub-program similar to that of the first embodiment is changed as indicated in FIG. 35 while the vehicle 100 passes through the S-shaped curve. It should be also understood that in this figure, the abscissa indicates a vehicle position on a road, and the ordinate represents a magnitude of the angle θnav in which this magnitude is indicated as a positive value when the vehicle 100 is turned to the right direction.

In this case, the light distribution control ECU 30 (FIG. 1) which calculates the angle θnav operates as follows. That is, when the vehicle 100 reaches the point B located in front of the point C (namely, position of vehicle 100 prior to the predetermined time T=3 seconds) which is equal to the starting point of the S-shaped curve, this light distribution control ECU 30 acquires a road shape of such a curved section which is located in front of the point C. Also similar to the above case, when the vehicle 100 reaches the point E located in front of the point F (namely, position of vehicle 100 prior to predetermined time T=3 seconds), which is equal to the terminal point of the section whose curvature is constant within the first left corner (section defined between points C to H), the light distribution control ECU acquires a road shape of a curved line changing section located before the point F.

Furthermore, the light distribution control ECU 30 operates as follows. That is, when the vehicle 100 reaches the point G located in front of the point H (namely, position of vehicle 100 prior to the predetermined time T=3 seconds) which is equal to the starting point of the second right corner (section defined between points H to L), since this light distribution control ECU 30 acquires a road shape of such a right corner which is located in front of the point H, the zero-cross point of the angle θnav is located in front of the point H. Then, when the vehicle 100 reaches the point J located in front of the point K (namely, position of vehicle 100 prior to predetermined time T=3 seconds), which is equal to the terminal point of the section whose curvature is substantially constant, the light distribution control ECU 30 acquires a shape of a road located before the point K.

To this end, as shown in FIG. 35, the angle θnav which is calculated by the first sub-program is gradually decreased with a gradually increasing change rate until the vehicle 100 passes through the point B in front of the point C and then reaches the point D, namely corresponding to the starting point of the constant curvature section. Then, the angle θnav becomes substantially constant after the vehicle 100 passes through the point D. Thereafter, this angle θnav is gradually increased with a gradually decreasing rate after the vehicle 100 passes through the point E located in front of the point F, namely corresponding to the end point of the constant curvature section. Subsequently, the angle θnav zero-crosses at the point G located in front of the point H corresponding to the inflection point, and is increased with a gradually increasing change rate up to the point I which corresponds to the starting point of the substantially constant curvature section in the second right corner (namely, section defined between point H and point L). Thereafter, the angle θnav is gradually decreased when the vehicle 100 passes the point J located in front of the point K which corresponds to the end of the constant curvature section, and then becomes a neutral value (zero) when the vehicle 100 reaches the point L which corresponds to the starting point of the straight section.

In this fifth embodiment, while the vehicle 100 travels through the S-shaped curve (FIG. 33) constructed of the point A to the point M, the control operation of the vehicle headlight apparatus 1 is carried out in accordance with the control flow chart shown in FIG. 27. Similar to the right corner case (FIG. 28), the vehicle headlight apparatus 1 determines a magnitude of a value d(θnav)/dt equal to the time differentiated value of the angle θnav in the step S152. In response to this determination result, a control operation whether the navigation-cooperated control operation is carried out (steps S162, S164, and S165), and another control operation as to which one of the two headlights should be set as the main light (steps S164 and S165) is also carried out.

Figure 36:
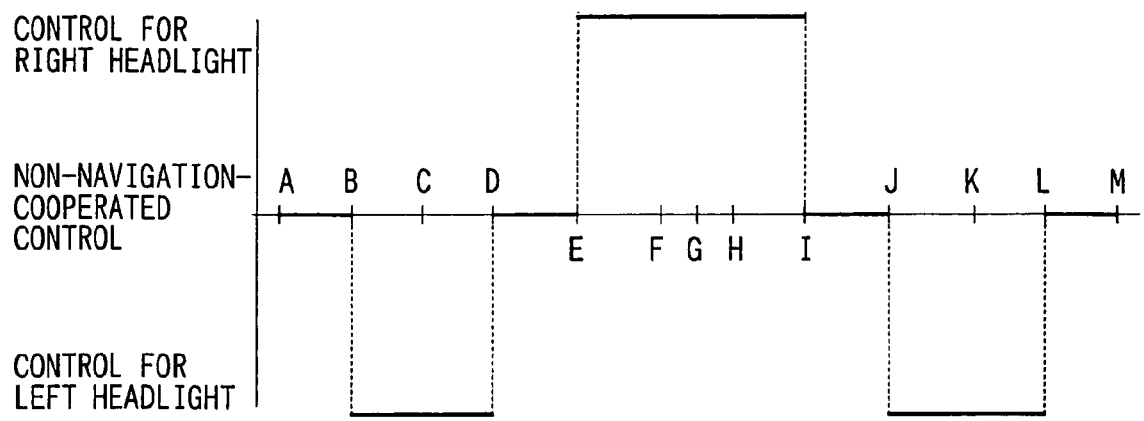
FIG. 36 is a graphic representation showing a condition of control operations in the S-shaped curve used in the apparatus of the fifth embodiment.

This control operation is shown in FIG. 36. It should also be noted that in this figure, the abscissa defines a vehicle position on a road, and the ordinate indicates three control conditions. In this figure, a one-eye navigation-cooperated control operation executed while the right headlight is employed as a main light located at an upper position indicates the control operation defined in the step S164 of FIG. 27. Also, a one-eye navigation-cooperated control operation executed while the left headlight is employed as a main light located at a lower position indicates the control operation defined in the step S165 of FIG. 27. Further, a non-navigation-cooperated control operation located at an intermediate position indicates the control operation defined in the step S162 of FIG. 27.

As shown in FIG. 35 and FIG. 36, within the section defined from the point A to the point B, the angle θnav maintains a neutral value (zero). Since the differentiated value d(θnav)/dt is also zero within this section, the process operation advances to the step S162 (FIG. 27) in which the navigation-cooperated control operation is stopped. In this step S162, both the optical axis directions of the right-sided headlight and the left-sided headlight are adjusted in such a manner that this angle becomes substantially coincident with the steering angle θstr which is calculated by the second sub-program.

Figure 37:
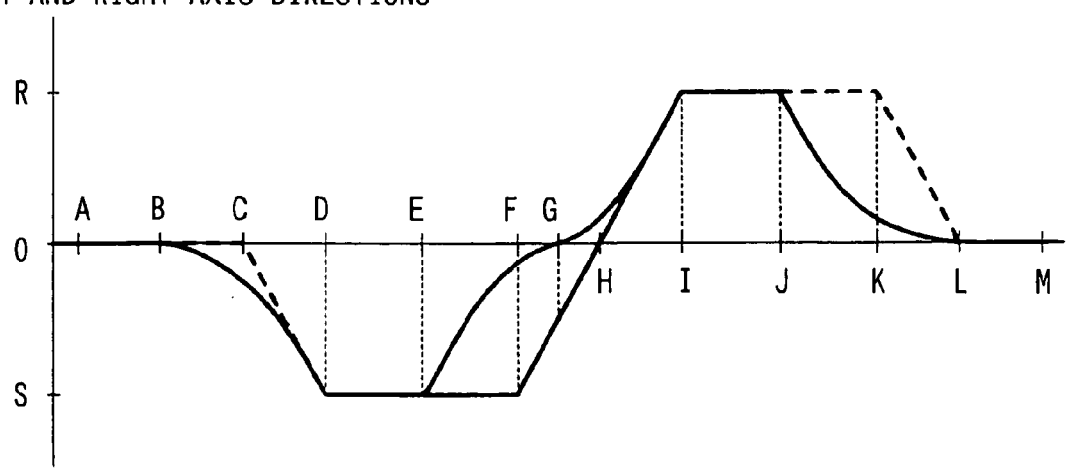
FIG. 37 is a graphic representation showing changes in optical axis angles of right and left headlights in the S-shaped curve used in the apparatus of the fifth embodiment.

As a consequence, as shown in FIG. 37, within the road section from the point A to the point B, the optical axis directions of the right headlight and the left headlight are adjusted to the angle θstr of the section defined between the point A and the point B in FIG. 34, namely adjusted to a neutral value (zero). In FIG. 37, the abscissa defines a vehicle position on a road, and the ordinate defines an optical axis angle that a right direction is expressed as a positive value, and a broken line shows an optical axis angle of the right headlight 110, and also, a solid line indicates an optical axis angle of the left headlight 120.

As shown in FIG. 35, the angle θnav is decreased with a gradually increasing change rate in the section defined between the point B and the point D. At this time, since the differentiated value d(θnav)/dt is a negative value, the process operation moves to a step S165 (FIG. 27). In this step S165, as indicated in FIG. 36 and FIG. 37, the main light is set to the left headlight 120 and is adjusted in such a way that the optical axis direction thereof becomes an angle θnav (namely, angle θnav of same section in FIG. 35). Also, the sub-light is set to the right headlight 110 and is adjusted in such a way that the optical axis direction thereof becomes an angle θstr (namely, angle θstr of same section in FIG. 34).

As shown in FIG. 35, in the section defined between the point D and the point E, the angle θnav again maintains a substantially constant value. At this time, since the differentiated value d(θnav)/dt becomes zero, the process operation advances to a step S162. In this step S162, as shown in FIG. 36 and FIG. 37, the optical axis directions of the right/left-sided headlights are adjusted in such a manner that the angle is made substantially coincident with the steering angle θstr (namely, steering angle θstr of same section in FIG. 34) which is calculated by the second sub-program.

Furthermore, as shown in FIG. 35, the angle θnav is increased in a gradually decreasing change rate in the section defined between the point E and the point I. At this time, since the differentiated value d(θnav)/dt is a positive value, the process operation moves to a step S164. In this step S164, as indicated in FIG. 36 and FIG. 37, the main light is set to the right headlight 110 and is adjusted in such a way that the optical axis direction thereof becomes an angle θnav (namely, angle θnav of same section in FIG. 35). Also, the sub-light is set to the left headlight 120 and is adjusted in such a way that the optical axis direction thereof becomes an angle θstr (namely, angle θstr of same section in FIG. 34).

Then, as shown in FIG. 35, in the section defined between the point I and the point J, the angle θnav again maintains a substantially constant value. At this time, since the differentiated value d(θnav)/dt becomes zero, the process operation advances to a step S162. In this step S162, as shown in FIG. 36 and FIG. 37, the optical axis directions of the right/left-sided headlights are adjusted in such a manner that the angle is made substantially coincident with the steering angle θstr (namely, steering angle θstr of same section in FIG. 34) which is calculated by the second sub-program.

Furthermore, as shown in FIG. 35, the angle θnav is decreased with a gradually decreasing change rate in the section defined between the point J and the point L. At this time, since the differentiated value d(θnav)/dt is a negative value, the process operation moves to a step S165. In this step S165, as indicated in FIG. 36 and FIG. 37, the main light is set to the left headlight 120 and is adjusted in such a way that the optical axis direction thereof becomes an angle θnav (namely, angle θnav of same section in FIG. 35). Also, the sub-light is set to the right headlight 110 and is adjusted in such a way that the optical axis direction thereof becomes an angle θstr (namely, angle θstr of same section in FIG. 34).

In the subsequent straight section defined between the point L and the point M, since the differentiated value d(θnav)/dt becomes zero, the process operation advances to the step S162. In this step S162, as shown in FIG. 36 and FIG. 37, the optical axis directions of the right/left-sided headlights are adjusted in such a manner that the angle is made substantially coincident with the steering angle θstr (namely, steering angle θstr of same section in FIG. 34) which is calculated by the second sub-program.

As described above, in accordance with the control operation, in the S-shaped curve shown in FIG. 33, when the vehicle 100 enters the first left corner, the left headlight 120 is set as the main light. Then, while the vehicle 100 travels in a half way of this left corner, the main light is switched to the right headlight 110. When the vehicle 100 gets out from the second right corner, the main light is again switched to the left headlight 120.

In the vehicle headlight apparatus 1 of this fifth embodiment, while one of the two headlights is set as the main light, which is located to the side to which the sight line direction of the vehicle driver is directed, this main light is controlled in accordance with the navigation-cooperated control operation. As a result, the vehicle headlight apparatus 1 can continuously illuminate the forward area in the proper manner in response to the shape of the forward road, so that the brightness of the viewing direction of the vehicle driver can be secured and the safety drive can be realized.

Figure 38:
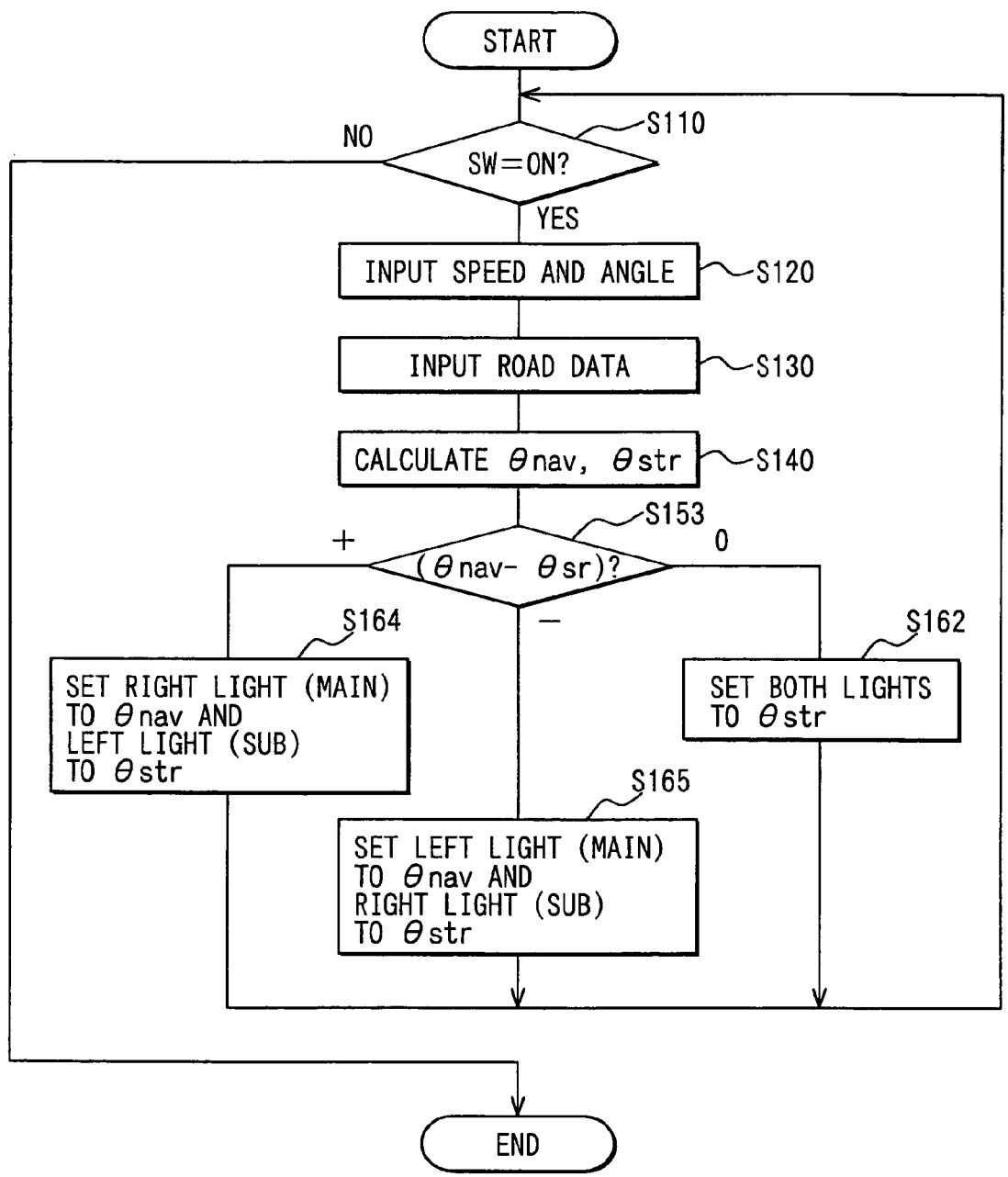
FIG. 38 is a flow chart showing a control operation of an optical axis of the headlight executed in the apparatus of the fifth embodiment.

It should also be noted that instead of the control flow chart shown in FIG. 27 of this fifth embodiment, a control flow chart shown in FIG. 38 is employed. In the control flow chart shown in FIG. 38, the step S152 for determining whether the differentiated value of d(θnav)/dt corresponds to the positive value, the negative value or zero is substituted by a step S153 for determining whether the differential value of d(θnav)−θstr is positive, negative or zero.

Similar to the control operation of this fifth embodiment, in accordance with this control flow chart, in the right corner shown in FIG. 28, as shown in FIG. 31, it is possible to realize that both the main light and the sub-light can be switched, and further, both the navigation-cooperated control operation and the non-navigation-cooperated control operation can be switched. Also, as shown in FIG. 32, the optical axis directions of the right/left headlights can be controlled. Furthermore, similar to the control operation of this fifth embodiment, in accordance with this control flow chart, in this S-shaped curve shown in FIG. 33, as shown in FIG. 36, it is possible to realize that both the main light and the sub-light can be switched, and further, both the navigation-cooperated control operation and the non-navigation-cooperated control operation can be switched. Also, as shown in FIG. 37, the optical axis directions of the right/left headlights can be controlled.

Also, in either step S152 or step S153 in the control flow charts shown in either FIG. 27 or FIG. 38, when the determination is made whether either value of differentiated d(θnav)/ dt or the differential value of (θnav−θstr) corresponds to a positive value, a negative value or is substantially equal to a zero, it is preferable to provide a predetermined threshold value range located in the vicinity of the zero. Then, the following determining operations are preferably carried out. That is to say, when the value of d(θnav)/dt or (θnav−θstr) is present within this predetermined threshold value range, it is so determined that this value is nearly equal to the zero, and the process operation advances to a step S162. Also, when the value of d(θnav)/dt or (θnav−θstr) is smaller than this predetermined threshold value range, it is so determined that this value is equal to the negative value, and the process operation advances to a step S165. Also, when the value of d(θnav)/dt or (θnav−θstr) is larger than this predetermined threshold value range, it is so determined that this value is equal to the positive value, and the process operation advances to a step S164.

Sixth Embodiment

Figure 39:
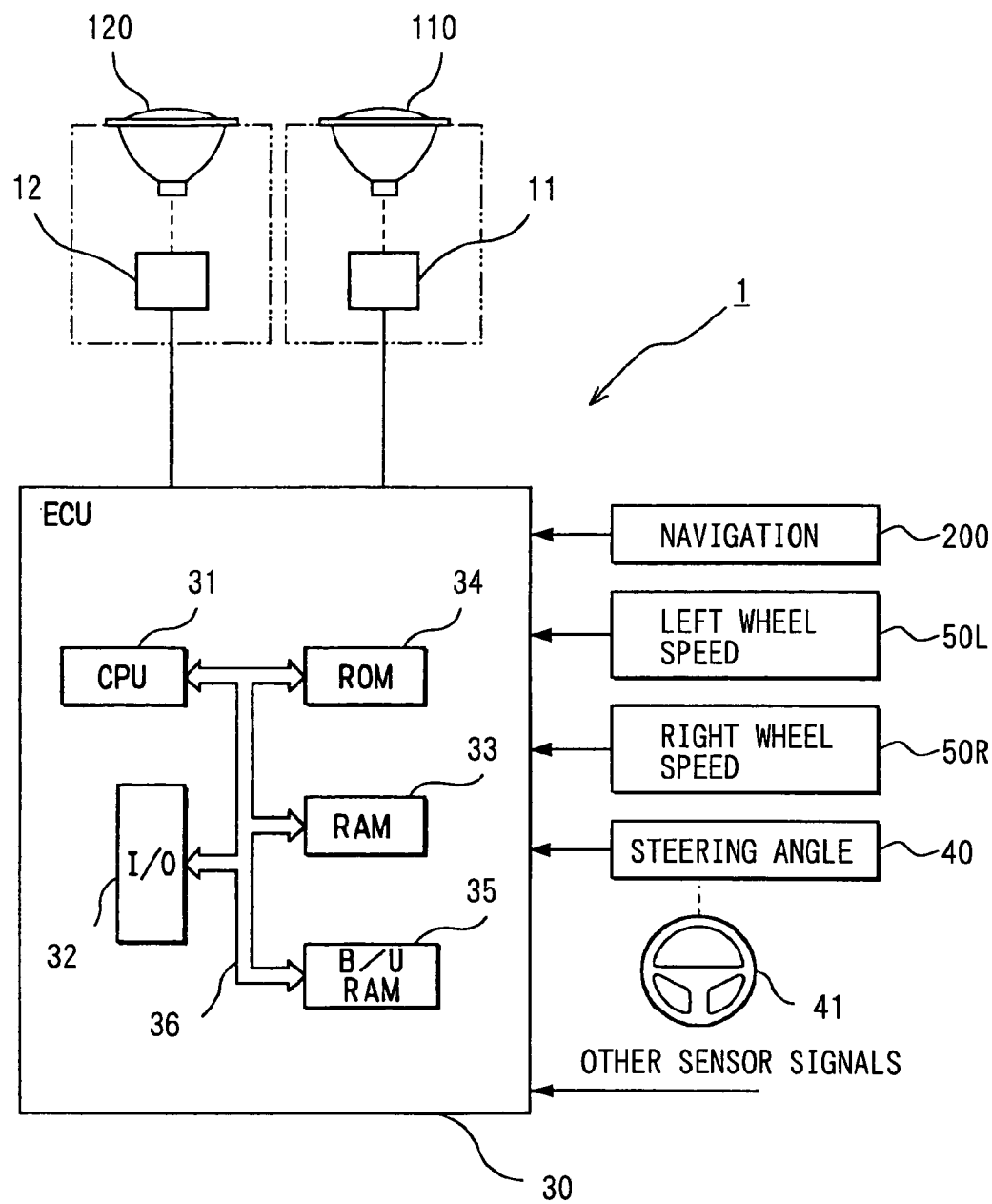
FIG. 39 is a schematic diagram showing an entire arrangement of an automatic optical axis direction adjusting apparatus for a vehicle headlight, according to a sixth embodiment and a seventh embodiment of the present invention.

In FIG. 39, the left headlight 120 and the right headlight 110 are provided as headlights on the front plane of a vehicle. The actuators 11 and 12 are connected to the right headlight 110 and the left headlight 120 respectively in order to adjust directions of optical axes thereof. Reference numeral 30 shows an ECU (electronic control unit). Reference numeral 31 indicates a CPU which functions as a central processing unit for executing various sorts of calculating operations. This ECU 30 is arranged as a logic calculating circuit which is constructed by the CPU 31, a ROM 34, a RAM 33, a B/U (backup) RAM 35, and an input/output circuit 32, and also, a bus line 36 which is used to connect these structural elements to each other. The ROM 34 stores therein a control program, a control map, and so on. The RAM 33 is to store therein various sorts of data.

The ECU 30 receives an output signal supplied from the navigation system 200, an output signal from a left wheel speed sensor 50L, an output signal from a right wheel speed sensor 50R, an output signal from a steering angle sensor 40, and other various sorts of sensor signals. The left wheel speed sensor 50L senses a left wheel speed VL of the left wheel of the vehicle. The right wheel speed sensor 50R senses a right wheel speed VR of the right wheel of the vehicle. The steering angle sensor 40 senses a steering angle STA of the steering wheel 41 which is steered by a vehicle driver. The output signals produced from the ECU 30 are inputted to the respective actuators 11 and 12 of the left headlight 120 and right headlight 110 of the vehicle in order that the optical axis directions of the left headlight 120 and the right headlight 110 are adjusted.

Figure 40:
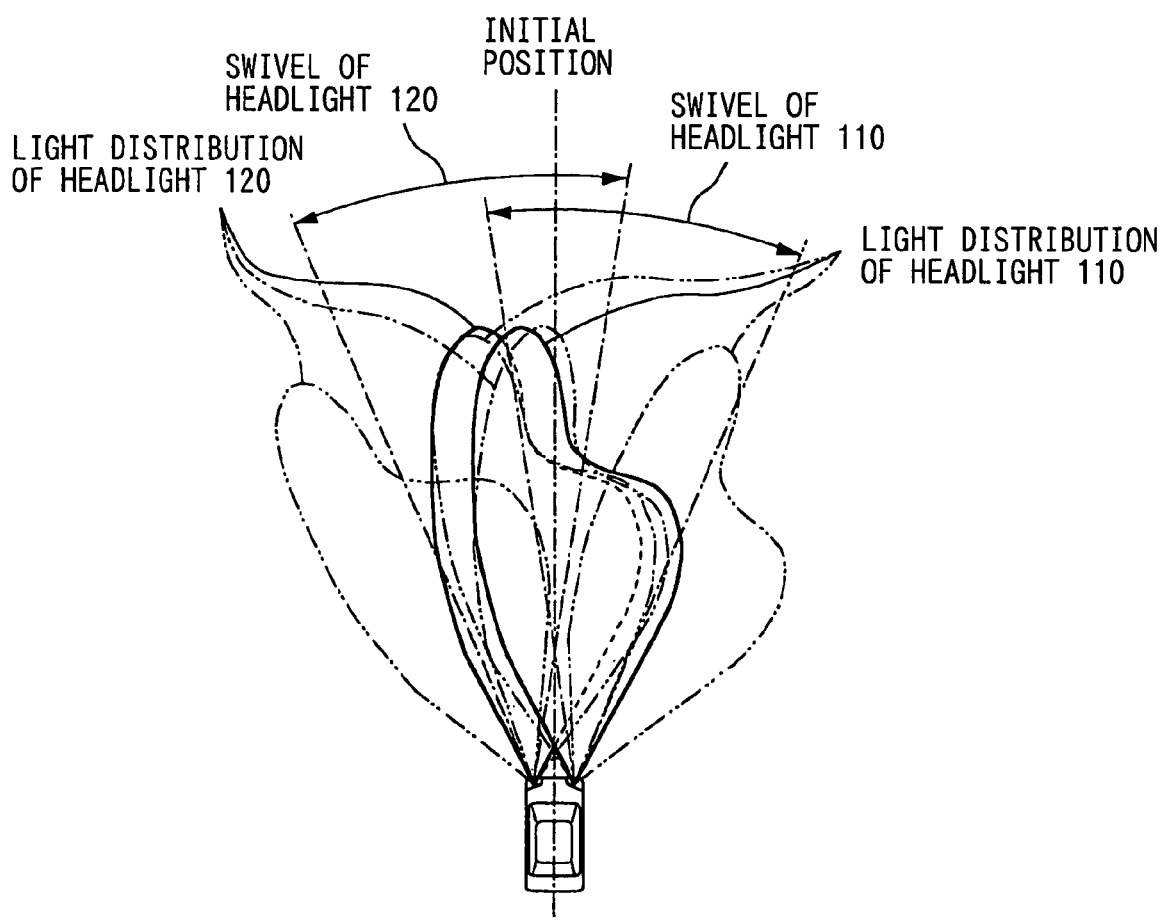
FIG. 40 is an explanatory diagram showing a light distribution area of a headlight in the automatic optical axis direction adjusting apparatus for the vehicle headlight, according to the sixth embodiment and the seventh embodiment of the present invention.

In the arrangement of this sixth embodiment, as shown in FIG. 40, it should be noted that light distribution areas (low beams) of the left headlight 120 and the right headlight 110 are adjusted from the initial position to either a right direction or a left direction within a swivel control range in response to a steering operation of the steering wheel 41 from a neutral point to either a right direction or a left direction. In this swivel control range, a visually recognizable characteristic in either the right direction or the left direction in conjunction with the steering operation of the steering wheel 41 by the vehicle driver is considered without adversely affecting a forward recognizable characteristic of the vehicle driver.

As a consequence, in the right turning operation of the vehicle by steering the steering wheel 41, the swivel control range of the headlight 110 in the right direction with respect to the light distribution area of the headlight 110 is made wider than the swivel control range of the headlight 120 with respect to the light distribution area of the headlight 120. Conversely, in a left turning operation of the vehicle by steering the steering wheel 41, the swivel control range of the headlight 120 in the left direction with respect to the light distribution area of the headlight 120 is made wider than the swivel control range of the headlight 110 with respect to the light distribution area of the headlight 110.

Figure 41:
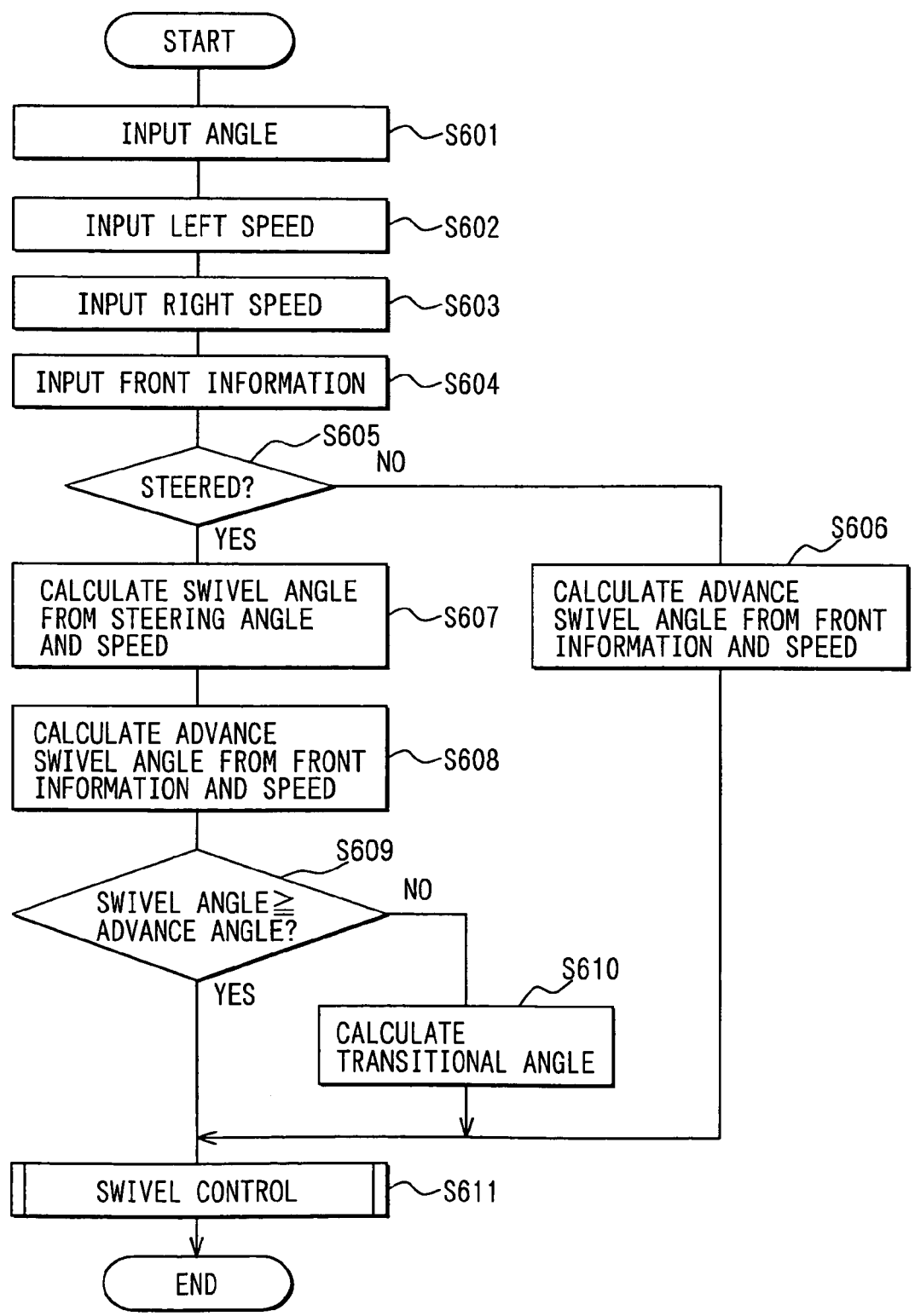
FIG. 41 is a flow chart showing a control operation of a swivel control executed by a CPU employed in an ECU which is used in the automatic optical axis direction adjusting apparatus for the vehicle headlight according to the sixth embodiment of the present invention.

The ECU 30, particularly CPU 31 executes the swivel control routine shown in FIG. 41 repeatedly every time a predetermined time passes.

In FIG. 41, in a step S601, a steering angle STA detected by the steering angle sensor 40 is input. Next, the control operation advances to a step S602 in which the left wheel speed VL detected by the left wheel speed sensor 50L is input. Next the control operation advances to a step S603 in which the right wheel speed VR detected by the right wheel speed sensor 50R is input. Next, the control operation advances to a step S604 in which forward road information supplied from the navigation system 200 is input.

Next, the control operation moves to a step S605 in which the CPU 31 determines whether a steering operation steering angle change) of the steering wheel 41 is carried out. When the CPU 31 determines that the steering angle STA input in the step S601 does not exceed an insensible range of the neutral position, but the vehicle travels under straight travel condition and the steering operation is not carried out, the control operation advances to a step S606. In this step S606, the CPU 31 calculates an advance swivel control angle SWCadv which is expected to be required later although the steering angle has not been changed yet by the driver. This advance angle is calculated based on a vehicle speed V obtained based upon the left wheel speed VL input in the step S602 and the right wheel speed VR input in the step S603 and also the forward road information supplied from the navigation system 200 read in the step S604.

On the other hand, when the CPU 31 determines that the steering angle STA input in the step S601 exceeds the insensible range of the neutral position and the vehicle travels under turning travel condition, and also the steering operation is carried out, the control operation advances to a step S607. In this step S607, the CPU 31 calculates a swivel control angle SWC in response to the vehicle speed V obtained based upon the left wheel speed VL input in the step S602 and the right wheel speed VR input in the step S603, and also, the steering angle STA input in the step S601. Next, the control operation advances to a step S608. Similar to the step S606, the CPU 31 calculates an advance swivel control angle SWCadv in response to both the vehicle speed V obtained based upon the left wheel speed VL input in the step S602 and the right wheel speed VR input in the step S603, and also, the forward road information supplied from the navigation system 200 input in the step S604.

Next, the control operation advances to a step S609. In this step S609, the CPU 31 determines whether the swivel control angle SWC calculated in the step S607 is larger than or equal to the advance swivel control angle SWCadv calculated in the step S608. When the determination condition of the step S609 cannot be established, namely, if the swivel control angle SWC is smaller than the advance swivel control angle SWCadv, then the control operation advances to a step S610. In this step S610, a transitional swivel control angle SWCtrans in response to the elapsed time is calculated from the advance swivel control angle SWCadv.

In this case, a detailed calculation example as to the transitional swivel control angle SWCtrans is given as follows. First, a ratio of the advance swivel control angle SWCadv to the swivel control angle SWC is obtained from a table (not shown) in response to such an elapsed time from the time instant when the steering operation is carried out. Both the advance swivel control angle SWCadv and the swivel control angle SWC are weighted-averaged based upon this ratio, so that the transitional swivel control angle SWCtrans at the present time is calculated.

After either the process operation defined in the step S606 or the process operation defined in the step S610 is carried out, or when the determination condition defined in the step S609 is satisfied, that is, the swivel control angle SWC becomes larger than or equal to the advance swivel control angle SWCadv, the control operation advances to a step S611. In this step S611, the swivel control process operation is carried out. In a case that the advance swivel control angle SWCadv calculated in the step S606, the transitional swivel control angle SWCtrans calculated in the step S610, or the swivel control angle SWC calculated in the step S607 is used to control respective actuators 11 and 12 of the left headlight 120 and the right headlight 110 of the vehicle, so that the optical axis directions of the left headlight 120 and the right headlight 110 are adjusted.

According to the sixth embodiment, the swivel control is attained smoothly without changing the swivel angle suddenly, because the transition from the advance swivel control angle SWCadv to the swivel control angle SWC is made gradually.

Seventh Embodiment

Figure 42:
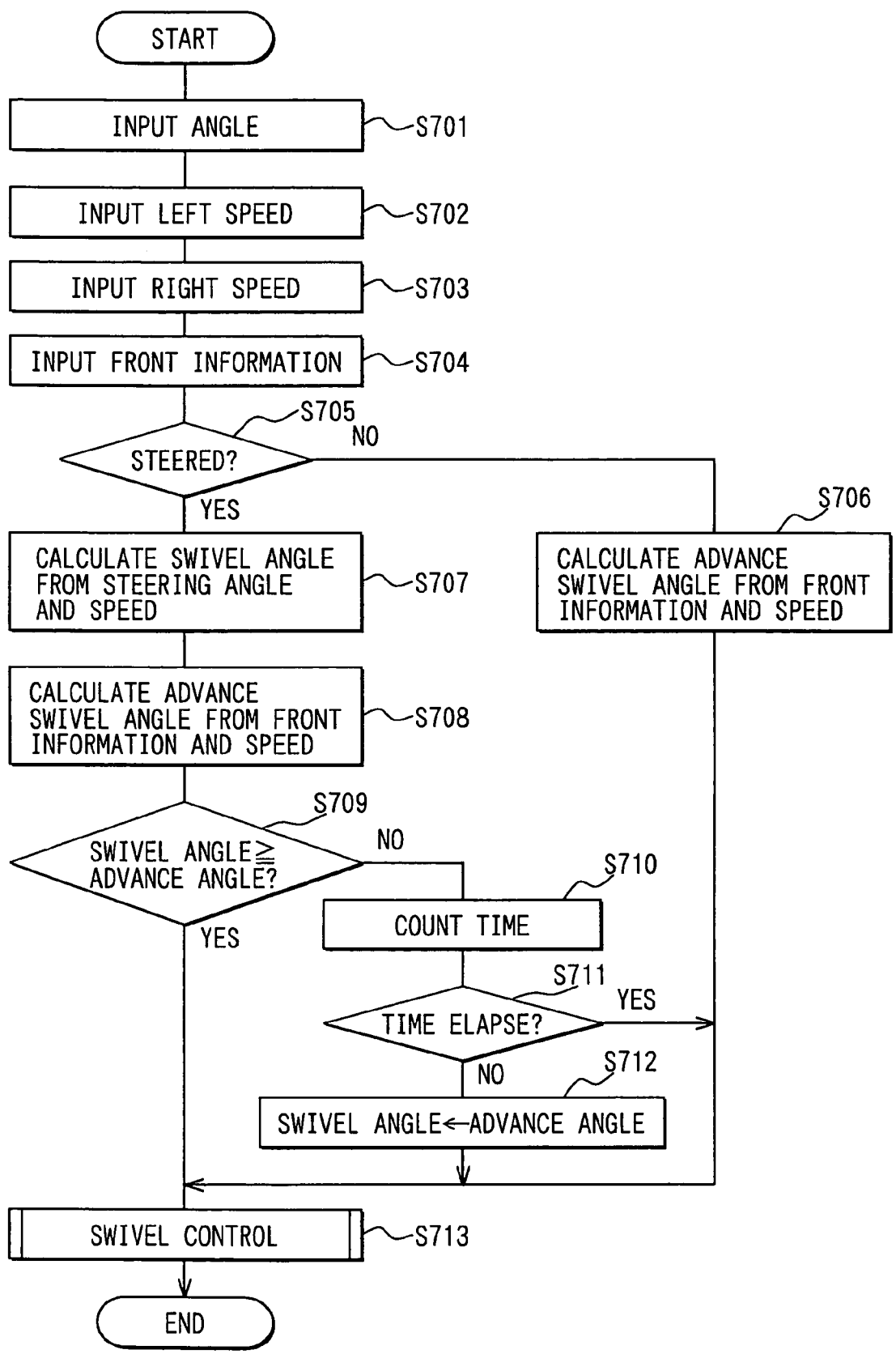
FIG. 42 is a flow chart showing a control operation of a swivel control executed by a CPU employed in an ECU which is used in the automatic optical axis direction adjusting apparatus for the vehicle headlight according to the seventh embodiment of the present invention.

In the seventh embodiment, the ECU 30 executes a control routine shown in FIG. 42 in the similar manner as in the sixth embodiment. In FIG. 42, since a step S701 to a step S709 correspond to the step S601 to the step S609 in the sixth embodiment. When the determination condition of the step S709 is not established, namely, the swivel control angle SWC is smaller than the advance swivel control angle SWCadv, the swivel control operation advances to a step S710.

In the step S710, a time counter is counted up, which counts a time elapse from a time instant when a steering operation of the steering wheel 41 is performed. Next, the control operation advances to a step S711. In this step S711, the CPU 31 determines whether the counted value of the time counter becomes larger than, or equal to a predetermined value. When the determination condition of the step S711 is not satisfied, namely when the counted value of the time counter is smaller than or equal to the predetermined value, the control operation advances to a step S712. In this step S712, the swivel control angle SWC is fixed to the advance swivel control angle SWCadv.

After a process operation defined in either the step S706 or the step S712 is carried out, the control operation advances to a step S713. Otherwise, in a case that the determination condition of the step S711 is established, namely, the counted value of the time counter exceeds the predetermined value indicating a time lapse, and the swivel control angle SWC does not reach the advance swivel control angle SWCadv within a predetermined time, the control operation advances to the step S713. Otherwise, when the determination condition of the step S709 is established, namely the swivel control angle SWC becomes larger than or equal to the advance swivel control angle SWCadv, the control operation advances to the step S713.

In the step S713, a swivel control process operation is carried out to control respective actuators 11 and 12 of the left headlight 120 and the right headlight 110 of the vehicle, so that optical axis directions of the left headlight 120 and the right headlight 110 can be adjusted. It is to be noted specifically that, in the step S713, the swivel control angle SWC calculated in the step S707 is used when the determination in the step S711 indicates that the time elapse exceeds the predetermined value, because the advance swivel control angle SWCadv calculated in the step S708 is likely to be incorrect.

According to the seventh embodiment, the swivel angle is first controlled based on the advance swivel control angle SWCadv until a driver starts to seer the steering wheel 41 and the swivel control angle SWC reaches the advance swivel control angle SWCadv. Thus, even when the control is switched from the advance swivel control to the normal swivel control, the front visibility for a driver will not be adversely affected.

Further, when the swivel control angle does not reach the advance swivel control angle SWCadv in the predetermined period of time after the start of steering operation by a driver, the swivel control is attained based on the swivel control angle irrespective of the advance swivel control angle SWCadv. As a result, erroneous operations of the optical axis control can be prevented even when the advance swivel control angle is calculated incorrectly.

What is claimed is:

1. An automatic optical axis direction adjusting apparatus for adjusting optical axes of one set of right and left headlights of a vehicle, comprising:

road data output means including a position detecting sensor for detecting a position of the vehicle and a map database for storing therein electronic map information, for referring to the map database based upon a detected position of the vehicle, and for outputting road data, the road data indicating a shape of a road which forms a travel route of the vehicle;

first swivel means for adjusting an optical axis direction of a main light corresponding to one of the right and the left headlights;

second swivel means for adjusting an optical axis direction of a sub-light corresponding to the other of the right and the left headlights;

control means for controlling the first swivel means and the second swivel means independently of each other, characterized in that the control means performs a one-eye navigation-cooperated control operation which adjusts only the optical axis direction of the main light to be coincident with a road direction calculated based upon the road data;

vehicle speed detecting means for detecting a speed of the vehicle; and updating means for processing the electronic map information stored in the map database so as to improve positional precision of the electronic map information, wherein:

the control means calculates a predicted vehicle position after a predetermined time elapses based upon the vehicle speed inputted from the vehicle speed detecting means and the road data inputted from the road data output means;

the control means sets a direction for expecting the predicted vehicle position as the road direction;

the control means controls the first and the second swivel means in a similar manner to further perform a two-eye navigation-cooperated control operation which adjusts both optical axes of the main light and the sub-light to be coincident with a road direction calculated based upon the road data;

the control means switches a control operation between the two-eye navigation-cooperated control operation and the one-eye navigation-cooperated control operation; and the control means switches the control operation between the one-eye navigation-cooperated control operation and the two-eye navigation-cooperated control operation to execute the switched navigation-cooperated control operation by checking whether the road data outputted from the road data output means corresponds to a data produced based upon the electronic map information, the positional precision of which is improved by the updating means.

2. The automatic optical axis direction adjusting apparatus as in claim 1, wherein:

the control means sets one of the right and the left headlights as the main light and the other of the right and the left headlights as the sub-light based upon the road data; and the control means executes the one-eye navigation-cooperated control operation for the main headlight.

3. The automatic optical axis direction adjusting apparatus as in claim 1, wherein:

the road data contains sort information indicative of a sort of a road; and the control means switches the control operation between the one-eye navigation-cooperated control operation and the two-eye navigation-cooperated control operation in response to the sort of the road which is indicated by the road data.

4. The automatic optical axis direction adjusting apparatus as in claim 1, further comprising:

steering angle detecting means for detecting a steering angle of a steering wheel, wherein the control means calculates a direction of a predicted travel route of the vehicle based upon the steering angle, and also controls the second swivel means to adjust the direction of the optical axis of the sub-light to be coincident with the direction of the predicted travel route, while performing the one-eye navigation-cooperated control operation.

5. The automatic optical axis direction adjusting apparatus as in claim 1, further comprising:

steering angle detecting means for detecting a steering angle of a steering wheel, wherein the control means calculates a direction of a predicted travel route of the vehicle based upon the detected steering angle, wherein the control means executes the navigation-cooperated control operation in a case that angle deviation between a direction of the optical axis of at least the main light which is adjusted based upon the road data and the direction of the predicted travel route is located in a range of a predetermined angle, wherein the control means does not execute the navigation-cooperated control operation in a case that the angle deviation exceeds the range of the predetermined angle, and wherein the control means executes a recovery control operation which adjusts the direction of the optical axis of at least the main light to be coincident with the direction of the predicted travel route by spending a predetermined time after the angle deviation exceeds the predetermined angle.

6. The automatic optical axis direction adjusting apparatus as in claim 1, wherein:

the main light is set to one of the left and the right headlights which is located on the side of an opposite vehicle lane while the vehicle travels, and the sub-light is set to the other of the left and the right headlights.

7. The automatic optical axis direction adjusting apparatus as in claim 1, wherein:

the main light is set to one of the left and the right headlights which is positioned on the side to which the road direction is directed, and the sub-light is set to the other of the left and the right headlights.

8. The automatic optical axis direction adjusting apparatus as in claim 1, wherein:

the main light is set to one of the left and the right headlights which is positioned on the side coincident to a direction along which the road direction is changed, and the sub-light is set to the other of the left and the right headlights.

9. The automatic optical axis direction adjusting apparatus as in claim 1, wherein:

an adjusting range of the optical axis direction of the right headlight is restricted to a predetermined range which is extended to an outer right side from a center axis located parallel to an axis of the vehicle; and an adjusting range of the optical axis direction of the left headlight is restricted to a predetermined range which is extended to an outer left side from the center axis located parallel to the axis of the vehicle.

10. The automatic optical axis direction adjusting apparatus as in claim 1, wherein:

the control means receives a mode signal which indicates whether a navigation system mounted on the vehicle performs a route navigation; and the control means executes the navigation-cooperated control operation while the navigation system performs the route navigation, and does not execute the navigation-cooperated control operation while the navigation system does not perform the route navigation.

11. The automatic optical axis direction adjusting apparatus as in claim 1, wherein:

the road data outputted by the road data output means contains sort information indicative of a sort of a road; and the control means switches whether the navigation-cooperated control operation is carried out in response to the sort of the road indicated by the road data.

12. An automatic optical axis direction adjusting apparatus for adjusting optical axes of one set of right and left headlights of a vehicle, comprising:

road data output means including a position detecting sensor for detecting a position of the vehicle and a map database for storing therein electronic map information, for referring to the map database based upon a detected position of the vehicle, and for outputting road data, the road data indicating a shape of a road which forms a travel route of the vehicle;

first swivel means for adjusting an optical axis direction of a main light corresponding to one of the right and the left headlights;

second swivel means for adjusting an optical axis direction of a sub-light corresponding to the other of the right and the left headlights;

control means for controlling the first swivel means and the second swivel means independently of each other, characterized in that the control means performs a one-eye navigation-cooperated control operation which adjusts only the optical axis direction of the main light to be coincident with a road direction calculated based upon the road data;

vehicle speed detecting means for detecting a speed of the vehicle; and steering angle detecting means for detecting a steering angle of a steering wheel, wherein:

the control means calculates a predicted vehicle position after a predetermined time elapses based upon the vehicle speed inputted from the vehicle speed detecting means and the road data inputted from the road data output means, the control means sets a direction for expecting the predicted vehicle position as the road direction, the control means calculates a direction of a predicted travel route of the vehicle based upon the detected steering angle, the control means executes the navigation-cooperated control operation in a case that angle deviation between a direction of the optical axis of at least the main light which is adjusted based upon the road data and the direction of the predicted travel route is located in a range of a predetermined angle, the control means does not execute the navigation-cooperated control operation in a case that the angle deviation exceeds the range of the predetermined angle, and the control means executes a recovery control operation which adjusts the direction of the optical axis of at least the main light to be coincident with the direction of the predicted travel route by spending a predetermined time after the angle deviation exceeds the predetermined angle.

13. The automatic optical axis direction adjusting apparatus as in claim 12, wherein:

the control means controls the first and the second swivel means in a similar manner to further perform a two-eye navigation-cooperated control operation which adjusts both optical axes of the main light and the sub-light to be coincident with a road direction calculated based upon the road data; and the control means switches a control operation between the two-eye navigation-cooperated control operation and the one-eye navigation-cooperated control operation.

14. The automatic optical axis direction adjusting apparatus as in claim 12, wherein:

an adjusting range of the optical axis direction of the right headlight is restricted to a predetermined range which is extended to an outer right side from a center axis located parallel to an axis of the vehicle; and an adjusting range of the optical axis direction of the left headlight is restricted to a predetermined range which is extended to an outer left side from the center axis located parallel to the axis of the vehicle.

15. The automatic optical axis direction adjusting apparatus as in claim 12, wherein:

the control means receives a mode signal which indicates whether a navigation system mounted on the vehicle performs a route navigation; and the control means executes the navigation-cooperated control operation while the navigation system performs the route navigation, and does not execute the navigation-cooperated control operation while the navigation system does not perform the route navigation.

* * * * *